(12) United States Patent
Eisemann et al.

(10) Patent No.: US 10,061,871 B2
(45) Date of Patent: Aug. 28, 2018

(54) LINEAR BLEND SKINNING WEIGHT OPTIMIZATION UTILIZING SKELETAL POSE SAMPLING

(71) Applicant: Technische Universiteit Delft, Delft (NL)

(72) Inventors: Elmar Eisemann, Delft (NL); Jean-Marc Thiery, Delft (NL)

(73) Assignee: Technische Universiteit Delft, Delft (NL)

( * ) Notice: Subject to any disclaimer, the term of this patent is extended or adjusted under 35 U.S.C. 154(b) by 419 days.

(21) Appl. No.: 14/809,458

(22) Filed: Jul. 27, 2015

(65) Prior Publication Data

US 2017/0032055 A1 Feb. 2, 2017

(51) Int. Cl.
| | |
|---|---|
| *G06F 17/50* | (2006.01) |
| *G06F 17/10* | (2006.01) |
| *G06T 13/40* | (2011.01) |
| *G06T 19/20* | (2011.01) |

(52) U.S. Cl.
CPC ............. *G06F 17/50* (2013.01); *G06F 17/10* (2013.01); *G06T 13/40* (2013.01); *G06T 19/20* (2013.01); *G06T 2219/2021* (2013.01)

(58) Field of Classification Search
CPC ......... G06F 17/50; G06F 17/10; G06T 13/40; G06T 19/20; G06T 2219/2021
See application file for complete search history.

(56) References Cited

U.S. PATENT DOCUMENTS

| | | | |
|---|---|---|---|
| 6,822,653 | B2 | 11/2004 | Boyd et al. |
| 7,515,155 | B2 | 4/2009 | Anderson et al. |
| 8,610,710 | B2 | 12/2013 | Lim et al. |

(Continued)

FOREIGN PATENT DOCUMENTS

| | | |
|---|---|---|
| KR | 10-0860375 B1 | 9/2008 |
| KR | 10-2010-0073174 A | 7/2010 |
| KR | 10-2011-0070736 A | 6/2011 |

OTHER PUBLICATIONS

Ladislav Kavan et al, Elasticity-inspired Deformers for character articulation, ACM SIGGRAPH Asia 2012, p. 1-8.*

(Continued)

*Primary Examiner* — Aniss Chad
*Assistant Examiner* — Chuen-Meei Gan
(74) *Attorney, Agent, or Firm* — Zaretsky Group PC; Howard Zaretsky

(57) ABSTRACT

A novel and useful mechanism for the skinning of 3D meshes with reference to a skeleton utilizing statistical weight optimization techniques. The mechanism comprises (1) an efficient high quality linear blend skinning (LBS) technique based on a set of skeleton deformations sampled from the manipulation space; (2) a joint placement algorithm to optimize the input skeleton; and (3) a set of tools for a user to interactively control the skinning process. Statistical skinning weight maps are computed using an as-rigid-as-possible (ARAP) optimization. The method operates with a coarsely placed initial skeleton and optimizes joint placements to improve the skeleton's alignment. Bones may also be parameterized incorporating twists, bends, stretches and spines. Several tools add additional constraints to resolve ambiguous situations and interactive feedback aids users.

24 Claims, 27 Drawing Sheets

(56) References Cited

U.S. PATENT DOCUMENTS

| | | | |
|---|---|---|---|
| 8,830,269 B2 | 9/2014 | Lim et al. | |
| 2008/0129737 A1 | 6/2008 | Lee et al. | |
| 2010/0033488 A1* | 2/2010 | Zhou | G06T 13/40 345/473 |
| 2011/0102436 A1* | 5/2011 | Elber | G06T 15/04 345/426 |
| 2012/0281019 A1* | 11/2012 | Tamstorf | G06T 3/0093 345/646 |
| 2013/0127853 A1 | 5/2013 | Corazza et al. | |
| 2014/0267306 A1* | 9/2014 | Koniaris | G06T 15/04 345/473 |
| 2015/0002517 A1* | 1/2015 | Lee | G06T 17/10 345/474 |

OTHER PUBLICATIONS

Olga Sorkine et al, As-Rigid-As-Possible Surface Mdeling, Eurographics Symposium Geometry Processing 2007 p. 1-8.*
Binh Huy Le, Robust and Accurate Skeletal Rigging from Mesh Sequences, ACM Transactions on Graphics (TOG) 33.4 (2014): 84.*
J.M. Thiery, ARAPLBS: Robust and efficient elasticity-based optimization of weights and skeleton joints for linear bind skinning with parameterized Bones, Computer Graphics forum, 2017, p. 1-13.*
Ladislav Kavan,Part 1: Direct Skinning Methods and Deformation Primitives, SIGGRAPH Course 2014, p. 1-11.*
Tomohiko Mukai, Building Helper Bones Rigs from Examples, ACM Feb. 27-Mar. 1, 2015, p. 77-84.*
Anguelov et al, SCAPE: Shape Completion and Animation of People, ACM Transactions on Graphics (TOG). vol. 24. No. 3. ACM, 2005, p. 408-416.*
Iiya Baran et al, Automatic Rigging and animation of 3D characters, ACM SIGGRAPH conference proceedings, p. 1-8 (Year: 2007).*
Le et at, Robust and accurate skeletal rigging from mesh sequences, ACM transactions on graphics, vol. 33 No. 4 article 84, Jul. 2014 (Year: 2014).*
Le et al, Smooth Skinning Decomposition with Rigid Bones, ACM transactions on graphics, vol. 31 No. 6 article 199, Nov. 2012 (Year: 2012).*
Baran, I. et al., "Automatic Rigging and Animation of 3D Characters," ACM Transactions on Graphics, vol. 26, Issue 3, Article 72, pp. 1-8, Jul. 2007.
Davis, T. A. et al., "Dynamic Supernodes in Sparse Cholesky Update/Downdata and Triangular Solves," ACM Trans. Math. Softw. vol. 35, No. 4, Article 27, pp. 1-23, Feb. 2009.
De Aguiar, E. et al., "Automatic Conversion of Mesh Animations into Skeleton-based Animations," EUROGRAPHICS 2008, vol. 27. No. 2, 2008.
Jacobson, A. et al., "Bounded Biharmonic Weights for Real-Time Deformation," ACM Transactions on Graphics, vol. 30, Issue 4, Artcile 78, pp. 1-8, Jul. 2011.
Jacobson, A. et al., "Stretchable and Twistable Bones for Skeletal Shape Deformation," ACM Transactions on Graphics, vol. 30, Issue 6, Article 165, Dec. 2011.
Jacobson, A. et al., "Smooth Shape-Aware Functions with Controlled Extrema," Eurographics Symposium on Geometry Processing , vol. 31, Issue 5, pp. 1577-1586, Aug. 2012.
Joshi, P. et al., "Harmonic Coordinates for Character Articulation," ACM Transactions on Graphics, vol. 26, Issue 3, Article 71, Jul. 2007.
Ju, T. et al., "Mean Value Coordinates for Closed Triangular Meshes," ACM Transactions on Graphics, vol. 24, Issue 3, pp. 561-566, Jul. 2005.
Kavan, L. et al., "Fast and Efficient Skinning of Animated Meshes," EUROGRAPHICS 2010, vol. 29. No. 2, 2010.
Kavan, L. et al., "Elasticity-Inspired Deformers for Character Articulation," ACM Transactions on Graphics, vol. 31, Issue 6, Article 196, Nov. 2012.
Le, B. H. et al., "Smooth Skinning Decomposition with Rigid Bones," ACM Transactions on Graphics, vol. 31, Issue 6, Article 199, Nov. 2012.
Le, B. H. et al., "Robust and Accurate Skeletal Rigging from Mesh Sequences," ACM Transactions on Graphics, vol. 33, Issue 4, Article 84, Jul. 2014.
Lewis, J.P. et al., "Pose Space Deformation: A Unified Approach to Shape Interpolation and Skeleton-Driven Deformation," Proc. 27th Ann. Conf Comp. Graphics, pp. 165-172, 2000.
Lipman, Y. et al., "Green Coordinates," ACM Transactions on Graphics, vol. 27, Issue 3, Article 78, Aug. 2008.
Magnenat-Thalmann, N. et al., "Joint-dependent local deformations for hand animation and object grasping," Proceedings on Graphics Interface 1988, pp. 26-33, 1988.
Manson, J. et al., "Moving Least Squares Coordinates," EUROGRAPHICS 2010, vol. 29. No. 5, Jul. 2010.
Milliron, T. et al., "A framework for geometric warps and deformations," ACM Transactions on Graphics, vol. 21, Issue 1, pp. 20-51, Jan. 2002.
Neumann, T. et al., "Compressed Manifold Modes for Mesh Processing," Computer Graphics Forum, vol. 33, Issue 5, pp. 35-44, Aug. 2014.
Pinkall, U. et al., "Computing Discrete Minimal Surfaces and Their Conjugates," Experimental Mathematics, vol. 2, Issue 1, pp. 1-28, Feb. 1993.
Sorkine, O. et al., "As-rigid-as-possible surface modeling," SGP '07 Proceedings of the fifth Eurographics symposium on Geometry processing, pp. 109-116, 2007.
Angelidis, A. et al., "Kinodynamic skinning using volume-preserving deformations," SCA '07 Proceedings of the 2007 ACM SIGGRAPH, pp. 129-140, 2007.
Capell, S. et al., "Interactive skeleton-driven dynamic deformations," ACM Transactions on Graphics, vol. 21, Issue 3, pp. 586-593, Jul. 2002.
Capell, S. et al., "Physically based rigging for deformable characters," Proceedings of the 2005 ACM SIGGRAPH, pp. 301-310. 2005.
Chen, C. H. et al., "Lattice-Based Skinning and Deformation for Real-Time Skeleton-Driven Animation," Proc. CADGRAPHICS 2011, pp. 306-312, 2011.
Feng, X et al., "Real Time Skeletal Animation With Dual Quaterion," J. Theoretical Applied Inform. Tech., vol. 49, No. 1, pp. 356-362, Mar. 2013.
Gregory, A. et al., "Offset curve deformation from skeletal animation," ACM SIGGRAPH 2008, Article 57, Aug. 2008.
Hyun, D. E. et al., "Sweep-based human deformation," The Visual Computer, vol. 21, Issue 8-10, pp. 542-550, Sep. 2005.
Jacobson, A. et al., "Fast automatic skinning transformations," ACM Transactions on Graphics, vol. 31, Issue 4, Article 77, Jul. 2012.
James, D. L. et al., "Skinning Mesh Animations," ACM Transactions on Graphics, vol. 24, Issue 3, pp. 399-407, Jul. 2005.
Ju, T. et al., "Reusable Skinning Templates Using Cage-based Deformations," ACM Transactions on Graphics, vol. 27, Issue 5, Article 122, Dec. 2008.
Kavan, L. et al., "Geometric Skinning with Approximate Dual Quaternion Blending," ACM Transactions on Graphics, vol. 27, Issue 4, Article 105, Oct. 2008.
Kavan, L. et al., "Automatic Linearization of Nonlinear Skinning," Proceedings of the 2009 symposium on Interactive 3D graphics and games, pp. 49-56, 2009.
Kho, Y. et al., "Sketching Mesh Deformations," ACM Transactions on Graphics, vol. 24, Issue 3, pp. 934-934, Jul. 2005.
Kim, T. et al., "Physics-based Character Skinning using Multi-Domain Subspace Deformations," Proceedings of the 2011 ACM SIGGRAPH, pp. 63-72, 2011.
Kry, P. G. et al., "EigenSkin: Real Time Large Deformation Character Skinning in Hardware," Proceedings of the 2002 ACM SIGGRAPH, pp. 153-159, 2002.
Landreneau, E. et al., "Poisson-based Weight Reduction of Animated Meshes," Computer Graphics Forum, vol. 29, Issue 6, pp. 1945-1954, Sep. 2010.

(56) References Cited

OTHER PUBLICATIONS

McAdams, A. et al., "Efficient elasticity for character skinning with contact and collisions," ACM Transactions on Graphics, vol. 30, Issue 4, Article 37, Jul. 2011.
Merry, B. et al., "Animation Space: A Truly Linear Framework for Character Animation," ACM Transactions on Graphics, vol. 25, Issue 4, pp. 1400-1423, Oct. 2006.
Mohr, A. et al., "Building Efficient, Accurate Character Skins from Examples," ACM Transactions on Graphics, vol. 22, Issue 3, pp. 562-568, Jul. 2003.
Rohmer, D. et al., "Exact volume preserving skinning with shape control," Proceedings of the 2009 ACM SIGGRAPH, pp. 83-92, 2009.
Rivers, A. R. et al., "FastLSM: Fast Lattice Shape Matching for Robust Real-Time Deformation," ACM Transactions on Graphics, vol. 26, Issue 3, Article 82, Jul. 2007.
Rumman, N. A. et al., "Position Based Skinning of Skeleton-driven Deformable Characters," Proceedings of the 30th Spring Conference on Computer Graphics, pp. 83-90, 2014.
Shi, X. et al., "Example-based Dynamic Skinning in Real Time," ACM Transactions on Graphics, vol. 27, Issue 3, Article 29, Aug. 2008.
Wang, X. C. et al., "Multi-Weight Enveloping: Least-Squares Approximation Techniques for Skin Animation," Proceedings of the 2002 ACM SIGGRAPH, pp. 129-138, 2002.
Wang, R. Y. et al., "Real-Time Enveloping with Rotational Regression," ACM Transactions on Graphics, vol. 26, Issue 3, Article 73, Jul. 2007.
Wareham, R. et al., "Bone Glow: An Improved Method for the Assignment of Weights for Mesh Deformation," Proc. 5th Int. Conf. Artic. Motion and Deform. Objs., pp. 63-71, 2008.
Weber, O. et al., "Context-Aware Skeletal Shape Deformation," Computer Graphics Forum, vol. 26, Issue 3, pp. 265-274, Sep. 2007.
Yang, X. et al., "Curve skeleton skinning for human and creature characters," Computer Animation and Virtual Worlds CASA 2006, vol. 17, Issue 3-4, pp. 281-292, Jul. 2006.
Kavan, L., "Part I: Direct Skinning Methods and Deformation Primitives," SIGGRAPH Course 2014, pp. 1-11, 2014.
Jacobson, A., "Part II: Automatic Skinning via Constrained Energy Optimization," SIGGRAPH Course 2014, pp. 1-28, 2014.
Jacobson, A., "Part III: Example-based Shape Deformation," SIGGRAPH Course 2014, pp. 1-20, 2014.
Le, B. H. et al., "Mesh Animation Decomposition and Compression," SIGGRAPH Course 2014, pp. 1-35, 2014.
Chen, Y. et al., "A Data Driven Approach to Efficient Character Articulation", Computer-Aided Design and Computer Graphics, 2013 International Conference pp. 1-3 Nov. 18, 2013.
International Search Report, PCT/US2016/043604, dated Nov. 16, 2016.
Written Opinion of the International Searching Authority, PCT/US2016/043604, dated Nov. 16, 2016.
International Search Report, PCT/US2016/043637, dated Nov. 15, 2016.
Written Opinion of the International Searching Authority, PCT/US2016/043637, dated Nov. 15, 2016.

* cited by examiner

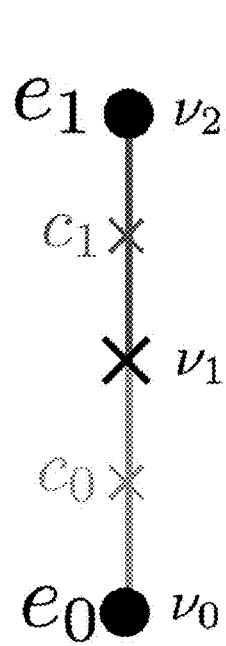 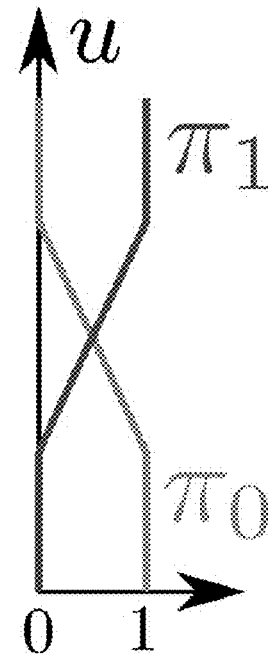
FIG.3A  FIG.3B
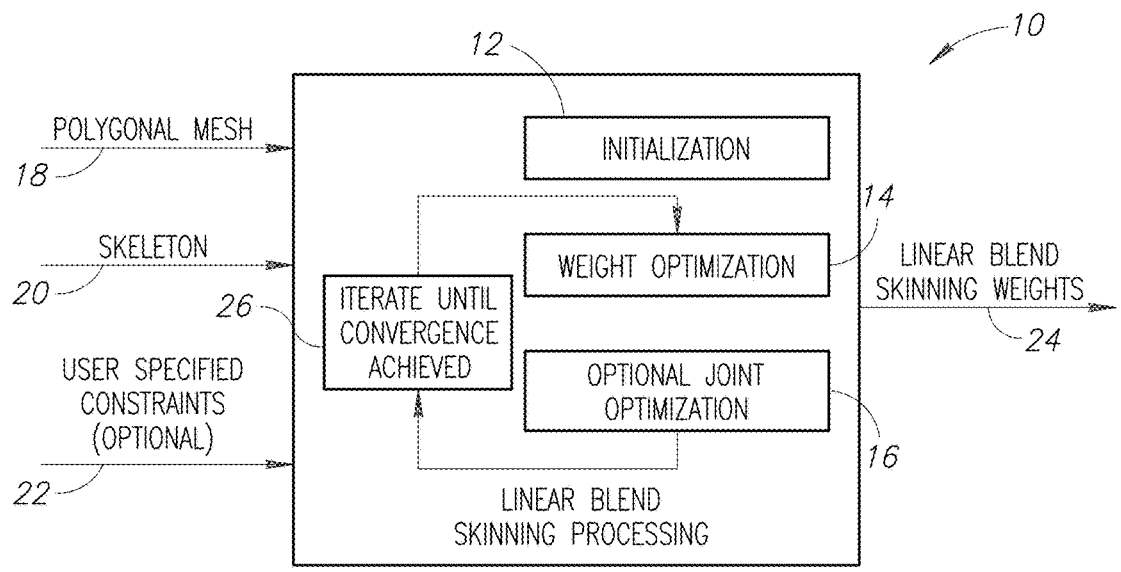
FIG.4

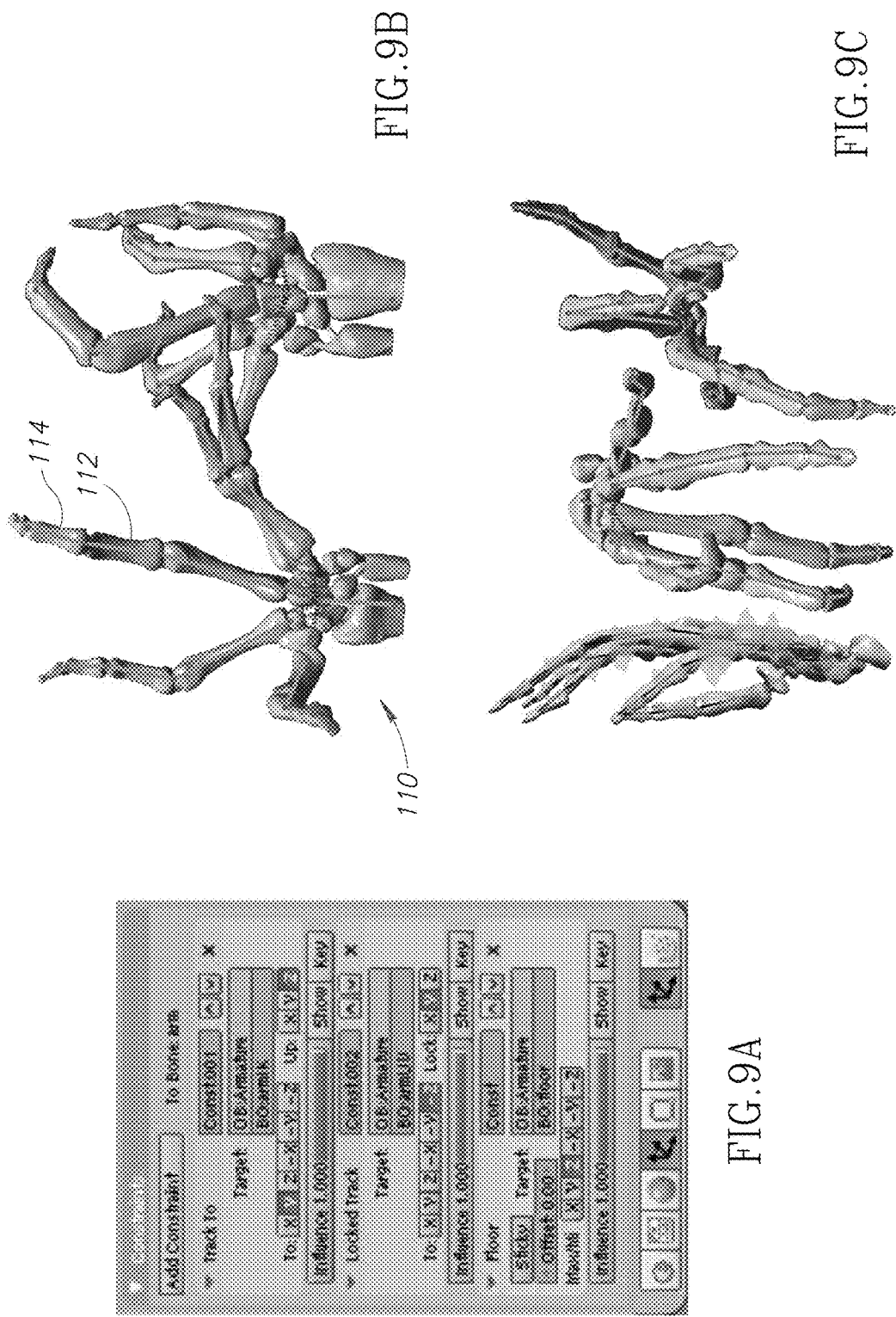

FIG. 14

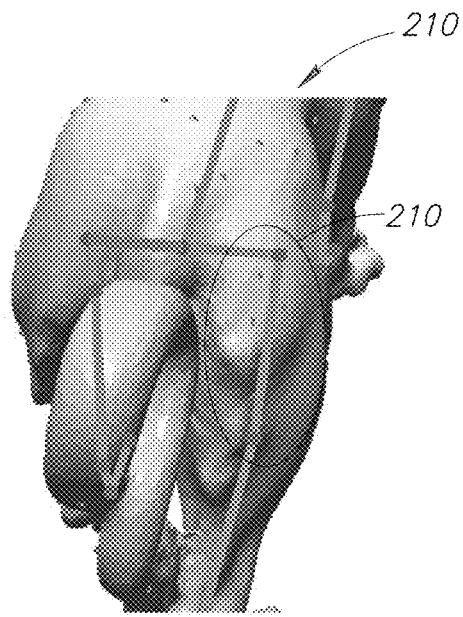
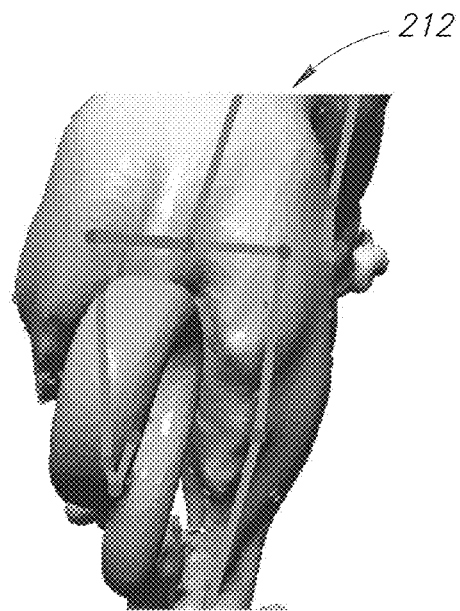
FIG.15A  FIG.15B
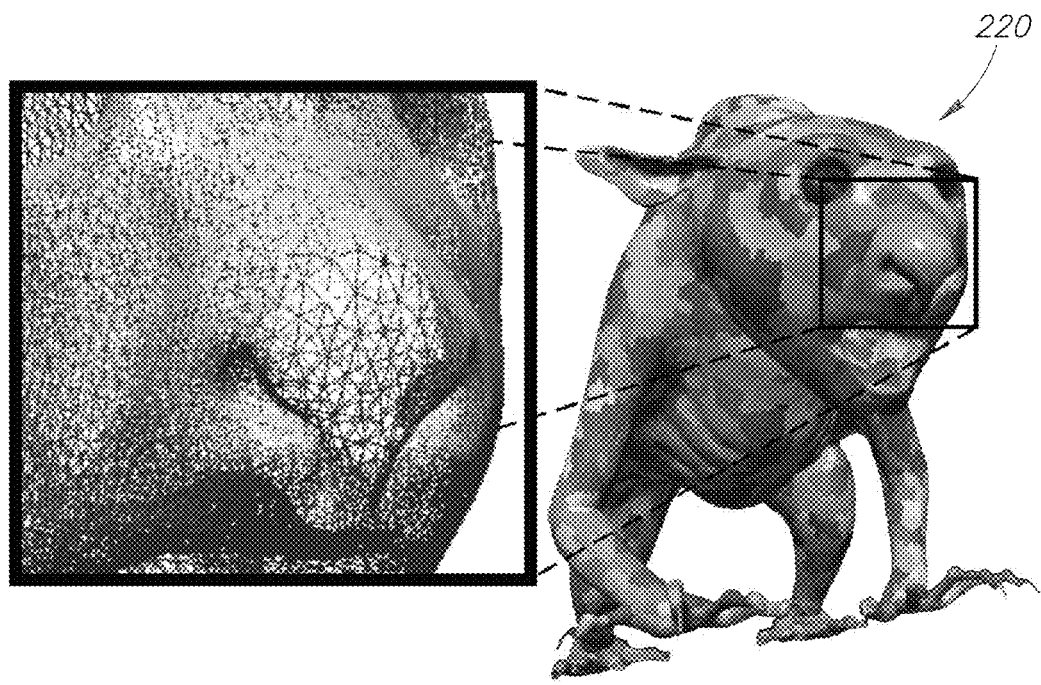
FIG.16A

LINEAR BLEND SKINNING WEIGHT OPTIMIZATION UTILIZING SKELETAL POSE SAMPLING

REFERENCE TO RELATED APPLICATION

This application is related to U.S. application Ser. No. 14/809,519, filed Jul. 23, 2015, entitled "Skeletal Joint Optimization For Linear Blend Skinning Deformations Utilizing Skeletal Pose Sampling," similarly assigned and incorporated herein by reference in its entirety.

FIELD OF THE INVENTION

The present invention relates to the field of computer graphics and more particularly relates to a mechanism for the skinning of 3D meshes with reference to a skeleton utilizing statistical weight optimization techniques.

BACKGROUND OF THE INVENTION

Linear Blend Skinning (LBS) is a well-known standard technique for skeleton based animation and used extensively in video games, movies, simulations and virtual-reality systems. One fact that makes LBS popular is that artists are used to manipulating skeletons for deformation and animation. Another is that the LBS expression or formula can be evaluated directly without the use of any optimization process. This is important if performance is relevant (e.g., games). The input mesh is transformed by blending bone transformations using skinning weights, which define the influence bones have on mesh vertices. Skinning is the process of computing these weights.

Skinning is a well-known standard technique in computer graphics for skeleton based animation that requires little computational overhead and has been used extensively in video games, movies, simulations and virtual-reality systems. This process associates a skeleton, defined by a set of segments, each storing a rotation/translation pair $\{(Rj,Tj)\}$ to a mesh. The skeleton can be manipulated, which modifies in turn the deformation pairs. These transformations can then be transferred to the mesh vertices. Specifically, the location of a vertex i under linear blend skinning (LBS) is determined by $$\sum_j w_{ij}(Rj \cdot v_i + Tj), \quad (1)$$

where $v_i$ is the original position of vertex i and $w_{ij}$ the influence of bone j on i. The major challenge lies in determining the weights $\{w_{ij}\}$ to ensure adequate transformations.

FIG. 1A illustrates an example standard skeleton topology 60 in Blender, which is a popular free and open source 3D creation software suite. The skeleton definitions 62, 68 (shown in FIGS. 1B and 1C) consist of vertices 63, 64, 70 where joints 70, 64 connect two segments 72 and oriented segments 66 for parent relations, and extremities 63 are connected to one segment only as shown in FIGS. 1B and 1C. For example, in FIG. 1C, the skeleton topology 68 includes bone F that is the parent of bones $C_1$ through $C_5$.

Considering typical meshes and their skeletons produced by artists, such as shown in FIG. 1A, it becomes clear that automatic skinning is challenging. First, models can consist of disconnected parts, which might not even be manifold. Second, the skeletal topology might differ from the mesh topology, as it is conceived to facilitate animating, not to follow geometric constraints. In particular, bones might jut out of the shape's interior. Further, it is not even possible to always define an interior. Third, the skeleton can be complex in itself. Previously, many automatic approaches cannot handle such input and require complex (or unwanted) and potentially costly mesh and skeleton modifications.

Typically, skinning weights should have certain properties (e.g., affinity, positivity, sparsity and locality). Approaches based on (k–)harmonic or general partial differential equations ensure this on the surface or on a volumetric embedding, while enforcing additional smoothness constraints derived from the geometry of the mesh/skeleton. Nonetheless, while smooth weights are necessary, they are not sufficient to enable high-quality deformations.

In prior art techniques, as the goal of the skinning process is to enable adequate deformations, the quality of the weights is generally assessed via experiments, in which several poses under reasonable user-defined transformations are produced. These poses are then evaluated using certain quality metrics, such as the conformality factor, which often serves as a main quality indicator. The above weight constraints, however, while being important, do not directly address this goal.

Thus, for practicality, there is a need for a skinning mechanism that overcomes the above-mentioned challenges and disadvantages of prior art techniques.

SUMMARY OF THE INVENTION

The present invention provides a novel and useful mechanism for the skinning of 3D meshes with reference to a skeleton utilizing statistical weight optimization techniques. The mechanism of the present invention comprises (1) an efficient high quality LBS skinning technique based on a set of skeleton deformations sampled from the manipulation space; (2) a joint placement algorithm to optimize the input skeleton; and (3) a set of tools for a user to interactively control the skinning process.

The approach of the mechanism of the present invention optimizes weights to achieve as-good-as-possible mesh deformations. These transformations are referred to as "as-rigid-as-possible" or ARAP transformations to benefit from their properties (angle, aspect ratio, edge length preservation, etc.). A set of representative skeleton deformations referred to as exemplars are then constructed that are sampled from the space of all possible transformations (i.e. the manipulation space).

The skinning weights are then optimized to achieve an ARAP transformation of the mesh for the exemplars. One reason the weights generated by the invention are naturally smooth is that differential quantities (i.e. Jacobian of the transformations, hence, involving the gradient of the weights) are considered in the process. Taking samples from the manipulation space or using user-provided skeleton animations (e.g., games often use predefined animations), naturally integrates constraints, such as joint-angular and axis-motion constraints of popular modeling packages (e.g., Blender, Maya) currently available.

The approach of the present invention is general and robust. Although compatible with volumetric meshes, it does not rely on volumetric structures for the weight computation on surface meshes. Otherwise, the input would be limited to objects that can be represented as a 2-boundary of a volume. The mechanism of the present invention is capable of handling numerous challenges, including for example, self intersections, open boundaries, disconnected parts or wire-edges, and is compatible with complex (i.e. parameterized) bones (e.g., twistable, stretchable and bendable bones, and spines, a generalization described in more detail infra). The mechanism also supports the user in fitting the skeleton to the input for an optimal deformation quality, which can be a tedious step for prior art approaches.

The mechanism was developed to maximize efficiency and user-friendliness. In addition, a sparsification scheme is utilized that is applied prior to the weight optimization step. This results in a performance increase of several orders of magnitude. This enables interactive tools to be provided to a user to control the skinning process using brush metaphors. Also provided is fine-tuning of sparsity and locality of the resulting skinning weights, which are properties that are ill defined in prior art approaches.

The methods of the present invention are capable of optimizing the skinning weights to achieve the desired properties of affinity, positivity, sparsity and locality, as well as an as-rigid-as-possible (ARAP) transformation behavior to preserve angles, aspect ratios, and edge lengths etc. To this extent, the methods of the present invention use an optimization process involving a set of representative deformations, which are sampled from the space of possible skeleton transformations, referred to as manipulation space. The skinning weights are optimized for these deformations to optimize for ARAP transformations and they are naturally smooth because differential quantities (the Jacobian of the transformations, thus, involving the gradient of the weights on the surface) are considered.

The solution of the present invention can support a large variety of triangle and tetrahedral meshes. Only very few assumptions are imposed, which makes it possible to use most existing models directly. In particular, the present method has been demonstrated on meshes featuring non-manifold structures, self-intersections, open boundaries, disconnected components and wire edges.

The invention further introduces several interactive tools to resolve ambiguous situations, e.g., for relationships between disconnected components. The user interaction remains minimal and, in most cases, the approach is actually automatic. User input is relied on only for configurations where all existing approaches fail.

The invention also supports the user in creating a skeleton, if needed. In this case, it is enough to define it coarsely with respect to the mesh. The method adapts this control structure automatically to reach an optimal deformation quality.

The invention also incorporates motion constraints on the skeleton. These restrictions are often readily available and provided by the artist for a skeleton in order to facilitate the use of the skeleton (e.g., the models on Blendswap.com) and can be defined easily. The method exploits this information naturally during the sampling process, which leads to a further increased quality of the weights.

Similarly, if examples of key transformations are provided, the method can integrate these seamlessly in the optimization process as well (e.g., in games where a few character animations are predefined). Finally, the fast execution of the algorithms of the method makes for an almost instant verification and immediate use of the results possible.

Specifically, the methods of the present invention include (1) an approach to sample exemplars in the manipulation space; (2) an exemplar based skinning weight optimization method that takes into account bones that can be stretched; (3) a joint-placement algorithm to optimize the input skeleton; (4) a selection of tools to control the skinning process; and (5) a set of accelerations to attain high performance.

There is therefore provided in accordance with the invention, a method of generating weights on a 3D model in the form of a polygonal mesh for linear blend skinning (LBS) transformations based on an input mesh and a skeleton, the method comprising receiving 3D mesh information and skeleton information related to the model, utilizing a plurality of representative structure preserving deformation exemplars of said skeleton taken from a manipulation space, optimizing said linear blend skinning weights for said deformities by optimizing for as rigid as possible (ARAP) transformations over said plurality of exemplars, and wherein said linear blend skinning weights deform a surface of said 3D mesh in an ARAP fashion when said skeleton is manipulated by a user.

There is also provided in accordance with the invention, a method of generating weights on a 3D model of the form of a polygonal mesh for linear blend skinning (LBS) transformations based on an input mesh and a skeleton, the method comprising receiving 3D mesh information and skeleton information related to the model, generating a plurality of representative structure preserving deformation exemplars of said skeleton sampled from a manipulation space of all possible skeleton deformations, expressing as rigid as possible (ARAP) energy for said plurality of representative deformation exemplars in terms of linear blend skinning weights, optimizing for said linear blend skinning weights in accordance with said deformation exemplars so as to minimize said ARAP energy, and wherein said linear blend skinning weights deform a surface of said 3D mesh in an ARAP fashion for arbitrary skeleton deformations in said manipulation space on average.

There is further provided in accordance with the invention, a method of generating weights on a 3D model of the form of a polygonal mesh for linear blend skinning (LBS) transformations based on an input mesh and a skeleton, the method comprising receiving 3D mesh information and skeleton information related to the model, expressing as rigid as possible (ARAP) energy for said plurality of representative deformation exemplars in terms of linear blend skinning weights, generating initial rough estimates for said linear blend skinning weights, reducing bone influence for each vertex thereby improving computational efficiency and enforcing locality, obtaining a plurality of representative structure preserving deformation exemplars of said skeleton from a manipulation space of all possible skeleton deformations, optimizing said linear blend skinning weights by minimizing an average as rigid as possible (ARAP) energy associated with said plurality of deformation exemplars taken from said manipulation space, and wherein said linear blend skinning weights deform a surface of said 3D mesh in an ARAP fashion for arbitrary skeleton deformations in said manipulation space on average.

There is also provided in accordance with the invention, a method of generating weights on a 3D model of the form of a polygonal mesh for linear blend skinning (LBS) transformations based on an input mesh and a skeleton incorporating bone transformations containing stretch, the method comprising receiving 3D mesh information and skeleton information incorporating bone transformations containing stretch, said mesh information and said skeleton information related to the 3D model, generating a plurality of representative structure preserving deformation exemplars of said skeleton sampled from a manipulation space of all possible skeleton deformations, defining an optimal set of matrices describing the local transformation of each vertex's neighborhood for each skeleton deformation exemplar, calculating, for each vertex, the stretch induced on the vertex's neighborhood when the bones influencing said vertex are stretched, optimizing said set of matrices by blending the stretch induced by the bones of said skeleton, expressing the energy for said plurality of representative deformation exemplars in terms of linear blend skinning weights, optimizing for said linear blend skinning weights in accordance with said deformation exemplars so as to minimize said energy, and wherein said linear blend skinning weights deform a surface of said 3D mesh for arbitrary skeleton deformations in said manipulation space.

BRIEF DESCRIPTION OF THE DRAWINGS

The invention is herein described, by way of example only, with reference to the accompanying drawings, wherein:

FIGS. 3A and 3B are diagrams illustrating an example of spine conversion into two bones;

FIG. 4 is a general block diagram illustrating the linear blend skinning processing of the present invention;

FIG. 9A is a diagram illustrating an example of skeleton constraints, such as fixed rotation axis or bounded range of rotation, editing in Blender;

FIGS. 9B and 9C are diagrams illustrating an example of skeleton deformation exemplars created respectively without and with such constraints using the present invention

FIG. 14 is a diagram illustrating algebraic construction of the exemplars;

FIG. 15A is a diagram illustrating example weights created with the present invention (without non-negativity constraints in this example) for eight exemplars;

FIG. 15B is a diagram illustrating example weights created with the present invention (without non-negativity constraints in this example) for 32 exemplars;

FIGS. 16A, 16B, 16C are diagrams illustrating clusterings of various sizes which are uniform despite anisotropic vertex distribution;

DETAILED DESCRIPTION OF THE INVENTION

1 Technical Basis 1.1 Skeleton Topology and Constraints

Figure 1A:
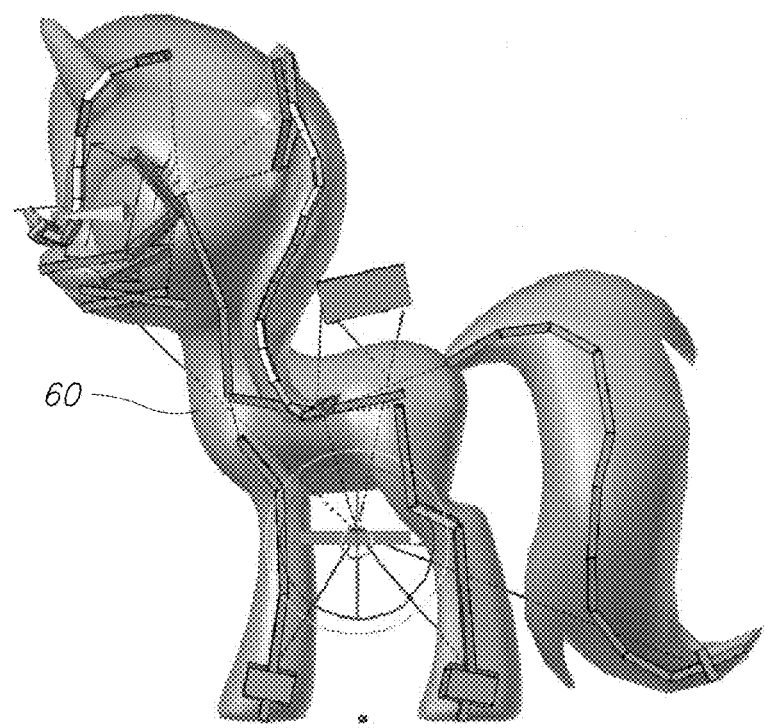
FIG. 1A is a diagram illustrating an example prior art skeleton topology.
Figure 1B:
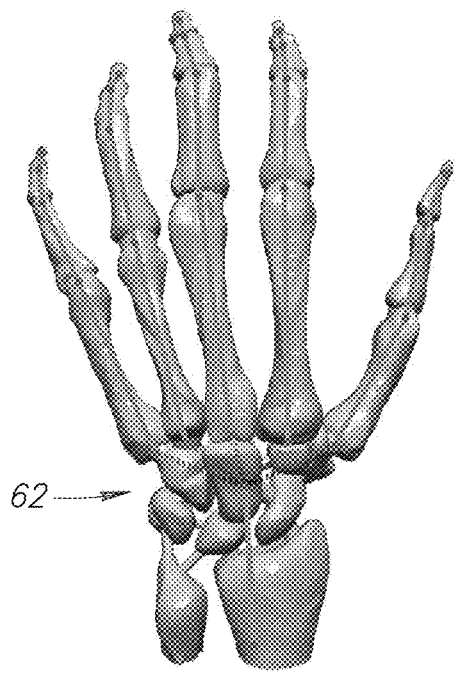
FIG. 1B is a diagram illustrating an example mesh and skeleton used to illustrate the principles of the present invention.
Figure 1C:
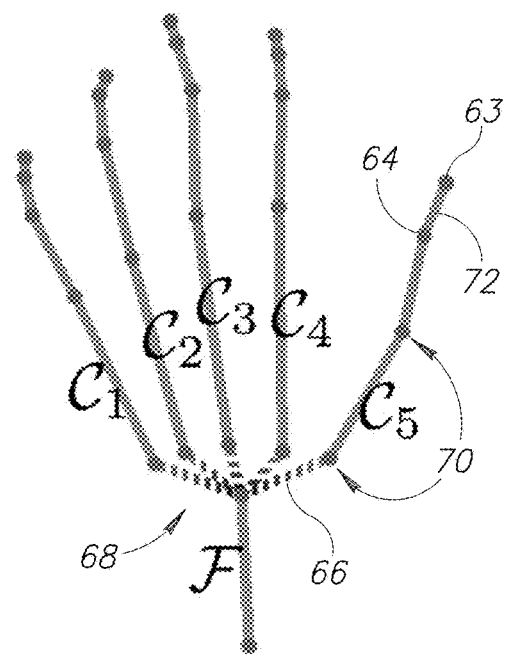
FIG. 1C is a diagram illustrating the detailed topology of the skeleton in FIG. 1B.

A skeleton as shown in FIGS. 1A, 1B and 1C is composed of skeletal vertices 63, 64, 70 and segments 66, 72, which are directed wire edges creating parent-child dependencies. Each segment consists of two vertices (for example segment 72 has vertices 64 and 63); an origin and a target along the segment's direction. Segments can be bones 72, whose transformations will have an influence on the mesh, or virtual segments, which are used to define parent-child relations between otherwise not directly connected bones. Virtual segments, e.g., 66, follow the deformations of the skeleton, but do not influence the mesh. Bones can have restrictions like maximal angles or imposed rotation axes.

1.2 Linear Blend Skinning (LBS) with Parameterized Bones

As explained supra, skinning is a standard technique in computer graphics for skeleton based animation that induces little computational overhead and has been used extensively in video games, movies, simulations, and virtual-reality systems. This process associates a skeleton, defined by a set of segments, each storing a rotation/translation pair $\{(R_j, T_j)\}$ to a mesh. The skeleton can be manipulated, which modifies in turn the deformation pairs. These transformations can then be transferred to the mesh vertices. Specifically, the location of a vertex i under linear blend skinning (LBS) is determined by the expression give in Equation 1 supra.

The location of a vertex i under LBS, using parameterized bones, is given by $$f: v_i \mapsto \sum_{j \in B(i)} w_{ij}(R_j(v_i) \cdot v_i + T_j(v_i)) \qquad (2)$$

where
- $v_i$ is the input vertex;
- $R_j(v_i)$ is the rotation applied to vertex i by bone j;
- $T_j(v_i)$ the translation applied to vertex i by bone j. Note that for rigid bones, these transformations are constant, but vary over the mesh for parameterized bones;
- B(i) is the set of bones influencing i;
- $w_{ij}$ the weight of vertex i with respect to bone j;

The quantity $\{B(i)\}$ is referred to as the bone influence maps and $\{w_{ij}\}$ is referred to as the weight maps.

The quantity being summed represents the rigid transformation applied to vertex i by bone j. Each bone (indexed by j) transforms the input vertex using a rigid transformation (i.e. a rotation and a translation). The final transformation of the vertex is obtained by averaging the transformations by all bones, using the weights w, which define the respective influence of the bones over the vertex.

Typically, skinning weights need to fulfill certain constraints:
1. Affinity: $\Sigma_j w_{ij}=1$; ensures that the model is not distorted under rigid transformations.
2. Positivity: $w_{ij} \geq 0$ for every bone j; prevents unnatural behavior (e.g., translating a bone in one direction could induce translations in the opposite direction).
3. Sparsity: only "few" $w_{ij}>0$; leads to simpler controls and a faster rendering process (ill-defined).
4. Locality: bones should have "small" influence zones; improves control over editing operations (ill-defined).

1.3 Spines

Figure 2B:
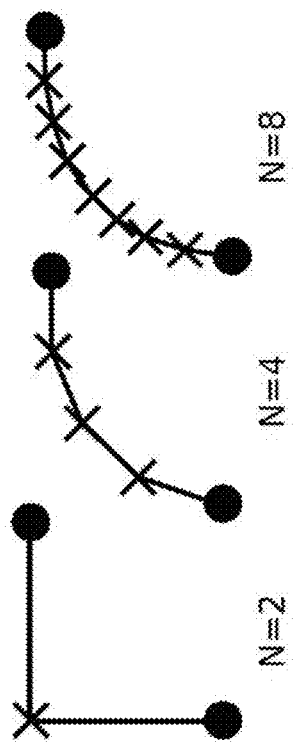
FIG. 2B is a diagram illustrating the limit behavior obtained when considering additional bones for the approximate representation of the spine.
Figure 2C:
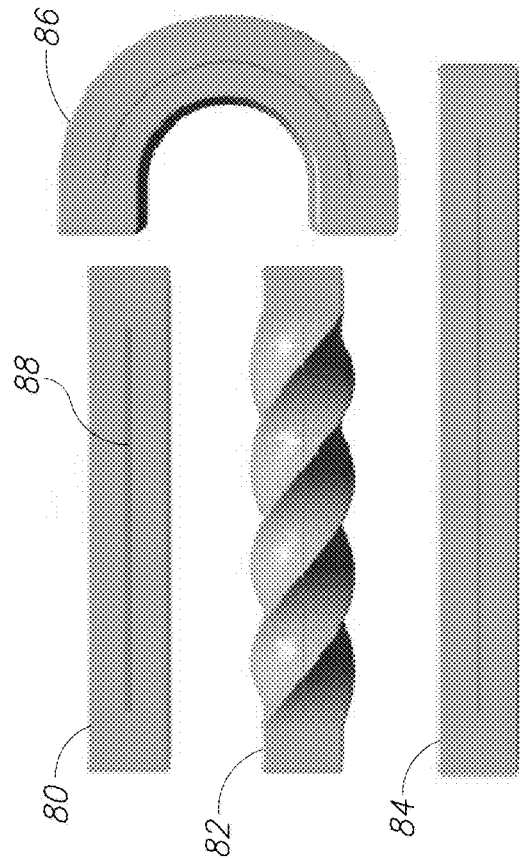
FIG. 2C is a diagram illustrating several examples of possible spine transformations including stretching, bending and twisting.
Figure 2A:
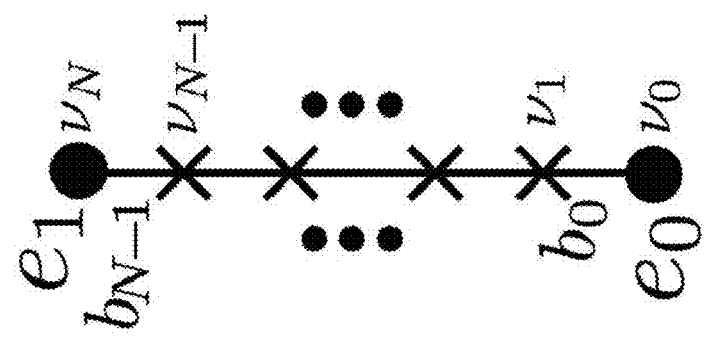
FIG. 2A is a diagram illustrating the process of constructing a spine as a bone subdivided into N small bones.

An example of parameterized bones is twistable and stretchable bones. The methods of the present invention are compatible with this kind of bones and a generalization referred to as "spines" which are introduced herein. A spine is defined as a skeletal segment $[e_0, e_1]$, which is subdivided into infinitely small bones, which undergo the same transformation as shown in FIGS. 2A, 2B and 2C. The term reflects its suitability to represent spines in models. Fixing $e_0$, the spine transformation combines a stretch $\sigma$ (84), affecting its length, and a rotation around an axis a, such that the accumulated rotation from $e_0$ to $e_1$ amounts to $\theta$. Similar to other bones, a spine also has a rigid transformation applied to $e_0$, the spine's base transformation ($R_s$, $t_s$). In consequence, a spine has five parameters: ($R_s$, $t_s$, $\sigma$, $\theta$, a). It generalizes twistable (e.g., $2\pi$ twist 82) and stretchable bones (84) because a twistable bone is a spine with a twist-only rotation. A $\pi$ rotation example is shown in 86. Formulas of the induced transformation for spines are presented infra.

A point p with parameter $u(p) \in [0, 1]$ (u describes "to which infinitely small bone" p is attached) is transformed by a spine as $$p \mapsto \underbrace{R_s R_{loc}(u(p)) \cdot p}_{\text{rotation}} + \underbrace{R_s \cdot t_{loc}(u(p)) + t_s}_{\text{translation}}, \qquad (3)$$

with $$R_{loc}(u) = Rot(a, u\theta) \qquad (4)$$

$$t_{loc}(u) = \qquad (5)$$
$$(Id - R_{loc}(u)) \cdot e_0 + \sigma \cdot (\sin(u\theta)/\theta - u\cos(u\theta))(Id - a \cdot a^T) \cdot \overrightarrow{e_0 e_1} +$$
$$\sigma \cdot (u\sin(u\theta) + (\cos(u\theta)-1)/\theta) a \times \overrightarrow{e_0 e_1} + u \cdot (\sigma - 1) R_{loc}(u) \cdot \overrightarrow{e_0 e_1}$$

Given a spine s with vertices $e_0$, $e_1$, one needs to define the above parameterization $u_s$: $V \to [0, 1]$ on the mesh vertices V to define the influence of the bone. It is possible to use complex (or artistically driven definitions. By default, we use a linear parameterization: $u_s(v_i) = \max(0, \min(1, (v_i - e_0)^T \cdot \overrightarrow{e_0 e_1}/\|\overrightarrow{e_0 e_i}\|^2))$ If an artist would like to manipulate a set of bones instead of a smooth spine, or a system that only supports rigid bones, a spine s can be converted into a set of bones. s is cut into n bones with vertices $v_0 \ldots v_n$ and for each $v_i$ its corresponding u-parameter $u_j$ is determined. We define the u-parameterization for a bone $v_j$ as a piecewise linear function $\{\pi_j: [0, 1] \to [0, 1]\}$, where $\pi_j(c_k) = \delta_k^j$, with $c_j = (u_j + u_{j+1})/2$. Additionally, we impose $\pi_0(0) = \pi_{n-1}(1) = 1$. The weight of a mesh vertex i w.r.t. bone k is defined as $w_{is} \pi_k(u_s(v_i))$. An example of a spine conversion into two bones is shown in FIG. 3.

1.4 As-Rigid-As-Possible (ARAP) Transformations

ARAP deformations include vertex positions that are optimized to reproduce almost rigid behavior in areas not specified by the user. Instead of vertices, the methods of the present invention focus on bone influences. An ARAP transformation $f$ minimizes the energy:

$$\mathfrak{E}(f, \mathcal{R}) := \sum_{i \in V} \Lambda_i \underbrace{\sum_{k \in V_1(i)} \lambda_{ik} \left\| \underbrace{(f(v_k) - f(v_i)) - \mathcal{R}(i) \cdot \underbrace{(v_k - v_i)}_{=: e_{ik}}}_{=: \tilde{e}_{ik}} \right\|^2}_{=: \mathcal{E}_i(f, \mathcal{R}(i)), \text{ the rigidity of vertex } i \text{ assuming rotation } \mathcal{R}(i)}, \qquad (6)$$

where $V_1(i)$ is the one ring neighborhood of vertex i, R(i) is a rotation matrix associated with vertex i, $\Lambda_i$ is an input vertex weight and $\lambda_{ik}$ an input weight for the directed edge $e_{ik}$ from vertex i to k to account for the local discretization of the mesh.

Regarding ARAP transformations, the optimum manner of defining LBS weights (i.e. skeleton weights) is really not known. It is known, however, what are 'good' transformations of a surface (i.e. the input mesh): ARAP transformations. This is because ARAP transformations preserve edge length, angles, surface and texture aspect. Therefore, the methods of the present invention define the LBS weights as those that deform the surface in a ARAP fashion when the skeleton is manipulated by the user.

The ARAP energy, expressed above in Equation 6, defines how much the transformations of the neighborhood of every vertex differ from rotations. This energy, which we want to minimize, depends on the transformation function f which depends on the LBS weights in this case. Given a transformation of the skeleton (i.e. the rotation and translation of the various bones), the LBS weights are optimized so as to obtain a deformation f which minimizes this ARAP energy.

Since it is not practical to do this for every possible skeleton transformation, a large number of skeleton transformations are created and it is assumed that these are representative enough of the transformations that will be used by an artist later on.

2 General Overview

A general block diagram of the skinning methods of the present invention is shown in FIG. 4. The processing block 10 comprises initialization block 12, weight optimization block 14, joint optimization block 16 (optional) and iteration block 26. The input to the methods of the present invention is a polygonal mesh 18 and a skeleton 20 having possible deformation restrictions (i.e. user specified constraints 22). The output is the skinning weights 24, which employed with LBS (i.e. Equation 2) minimize the ARAP energy (i.e. Equation 6) over a set of skeleton deformations.

Figure 5:
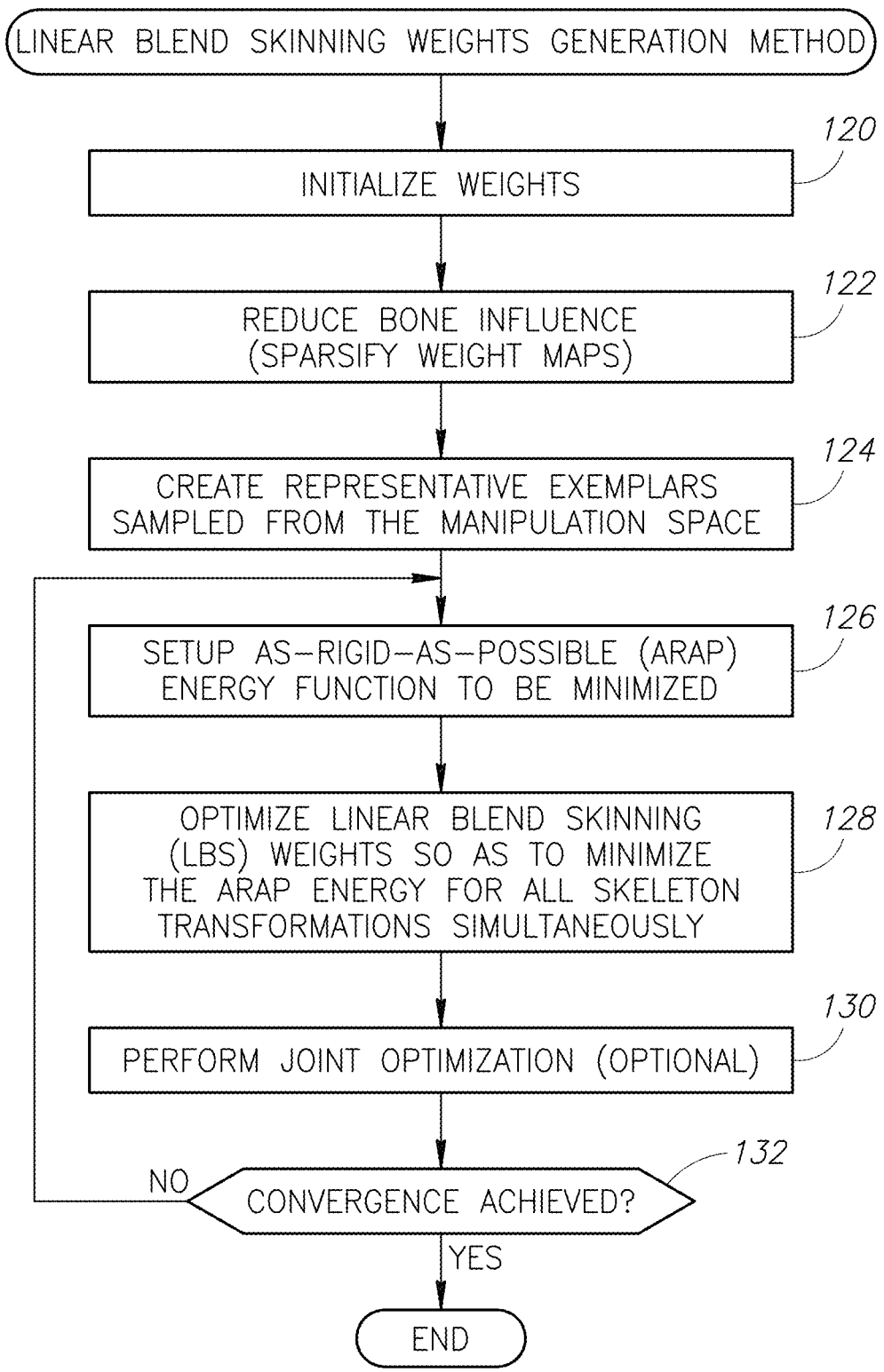
FIG. 5 is a flow diagram illustrating an example linear blend skinning method of the present invention.
Figure 6A:
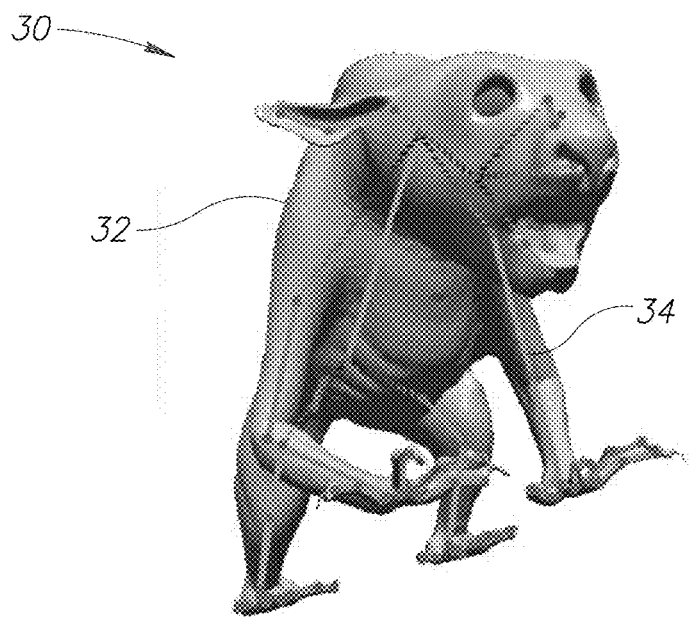
FIG. 6A is a diagram depicting an example input mesh and skeleton used to illustrate the method of generating linear blend skinning weights.
Figure 6B:
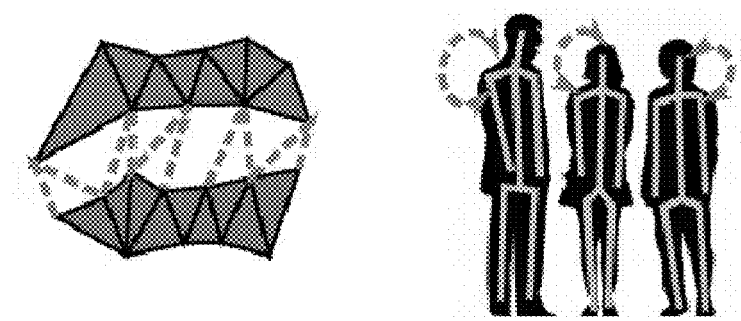
FIG. 6B is a diagram illustrating example input constraints.

A flow diagram illustrating the LBS skinning weights method of the present invention is shown in FIG. 5. An example of the overall process of the invention is shown in FIGS. 6A, 6B, 6C, 6D, 6E, 6F and 6G. FIG. 6A shows the 3D mesh 32 and skeleton 34 input for an example animated character 30 of an ogre. Optional user specified constraints are shown in FIG. 6B.

Figure 6C:
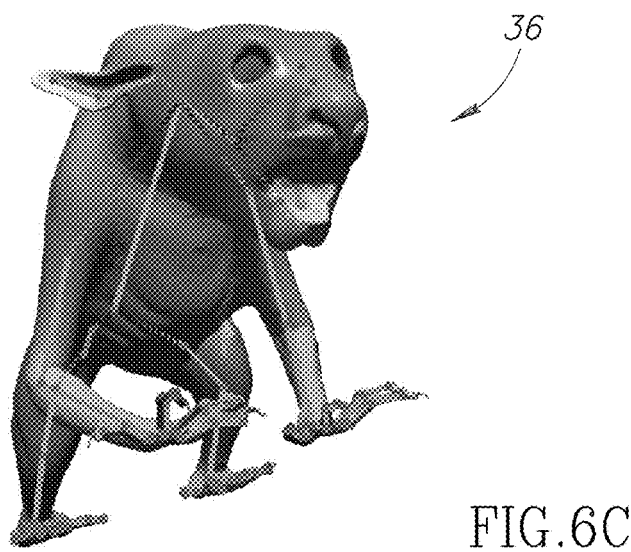
FIG. 6C is a diagram illustrating an example weight initialization.
Figure 6D:
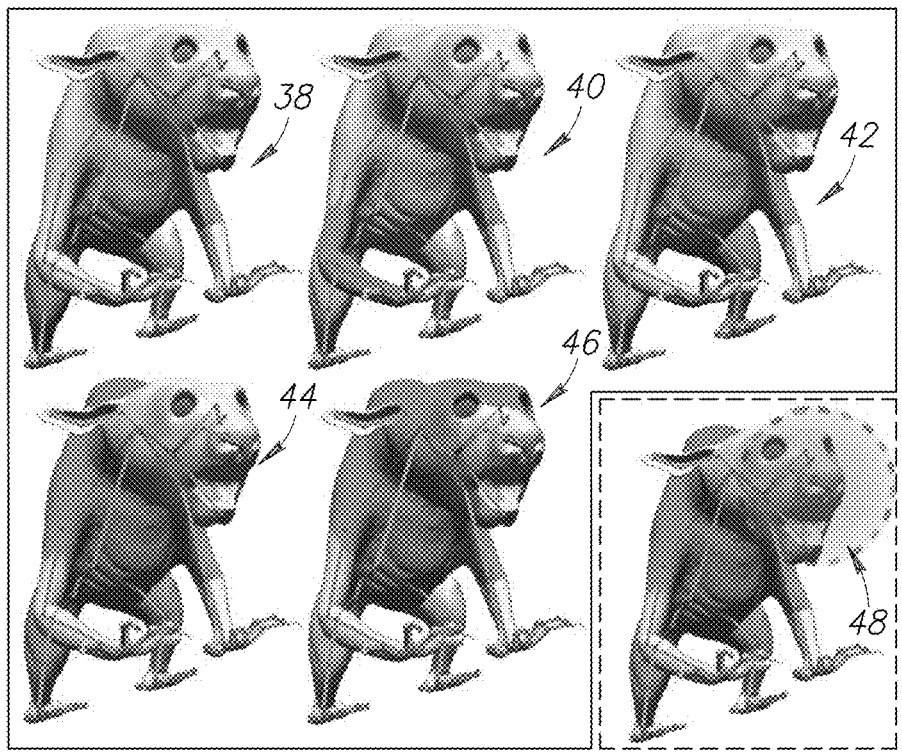
FIG. 6D is a diagram illustrating example weight maps sparsification and optional editing.
Figure 6E:
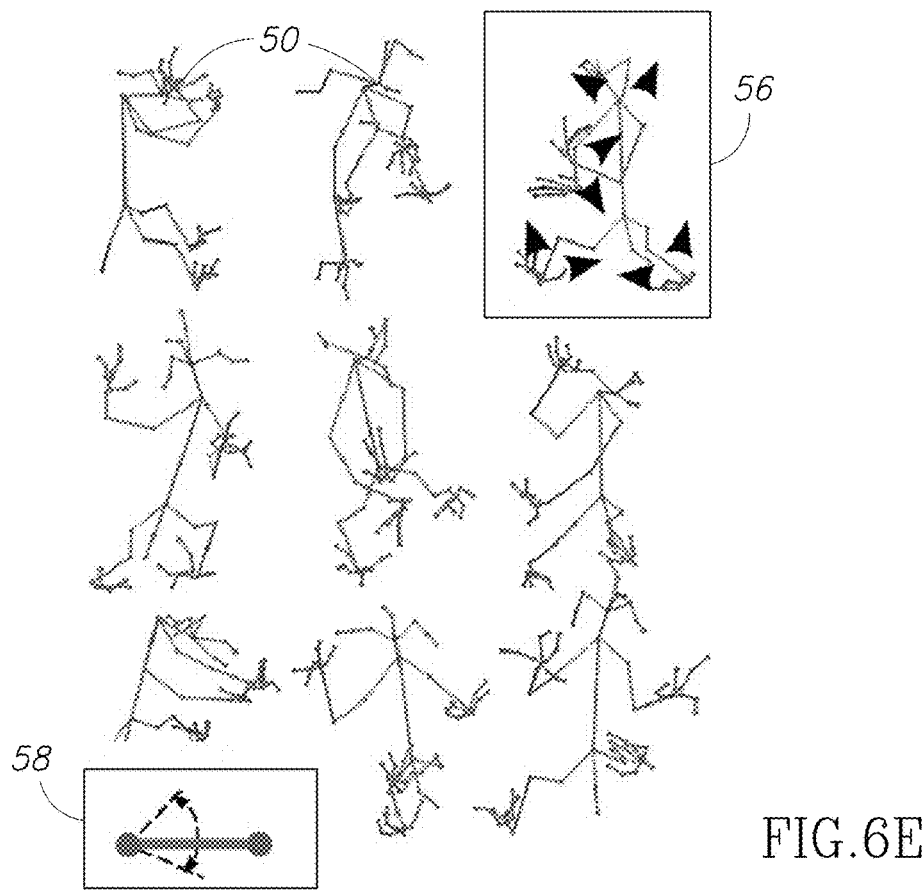
FIG. 6E is a diagram illustrating the creation of exemplars.
Figures 6F, 6G:
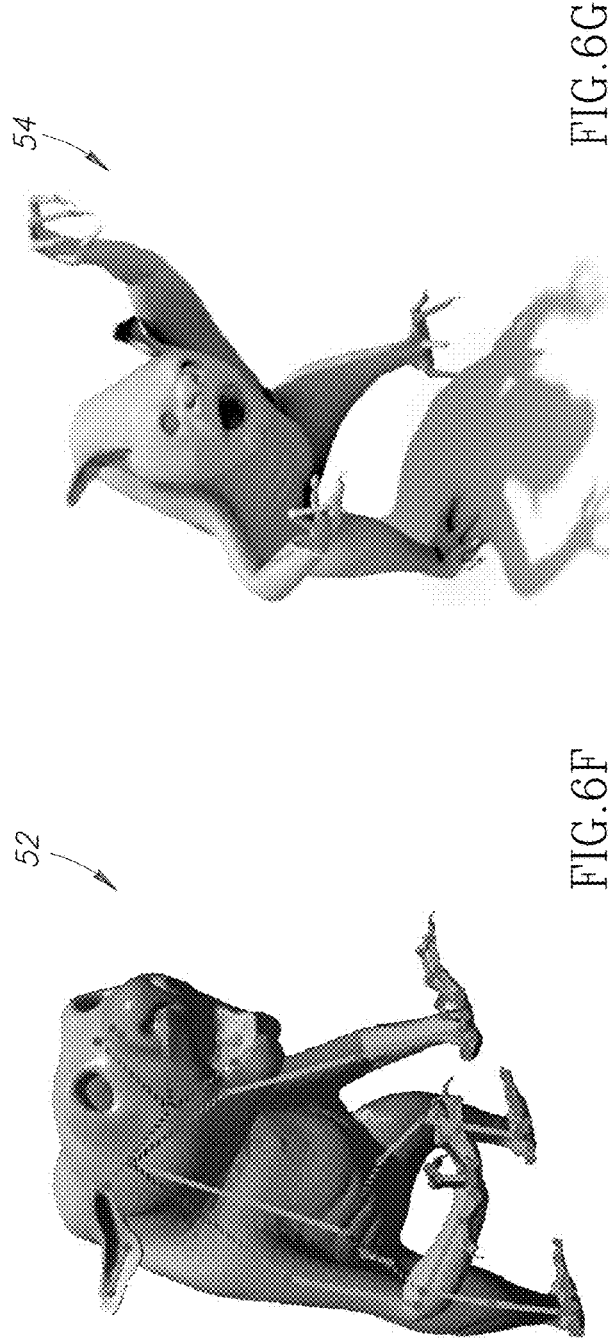
FIG. 6F is a diagram illustrating weight optimization and optional joint optimization in accordance with the present invention.
FIG. 6G is a diagram illustrating an example deformation created using the resulting weights.

During weight initialization as shown in FIG. 6C, a rough weight estimate based on the rest pose (e.g., 36) is generated (step 120). The weights are then sparsified, shown in FIG. 6D, by reducing the bone influence B(i) of each vertex i concurrently to localize the influence and improve performance (step 122) (see characters 38, 40, 42, 44 and 46). A user can also refine these bone-influence maps to fine-tune the process (48). Finally, a set of skeleton deformations 50 referred to as exemplars are generated, as shown in FIG. 6E, by sampling the manipulation space respecting skeleton constraints (58) or by using provided skeleton animations (56) (step 124). Note that the segments of the skeleton may include constraints 58. The resultant weight optimized and optional joint optimized character 52 is shown in FIG. 6F. A deformation example 54 is shown in FIG. 6G.

Note that the manipulation space is defined as the space of all possible transformations of the skeleton, which an artist can do. The rotation and translation of the bones cannot be arbitrary as they should at least preserve the connectivity of the bones at the joint. These transformations are generally constrained meaning that not every bone can be moved freely; some have maximum angle constraints. These constraints are taken into account when sampling from the manipulation space. In one embodiment, the methods of the present invention are operative to take as input existing skeleton animations. Note that it has been found that approximately 80 poses of the skeleton are sufficient to yield quality results.

Figure 7:
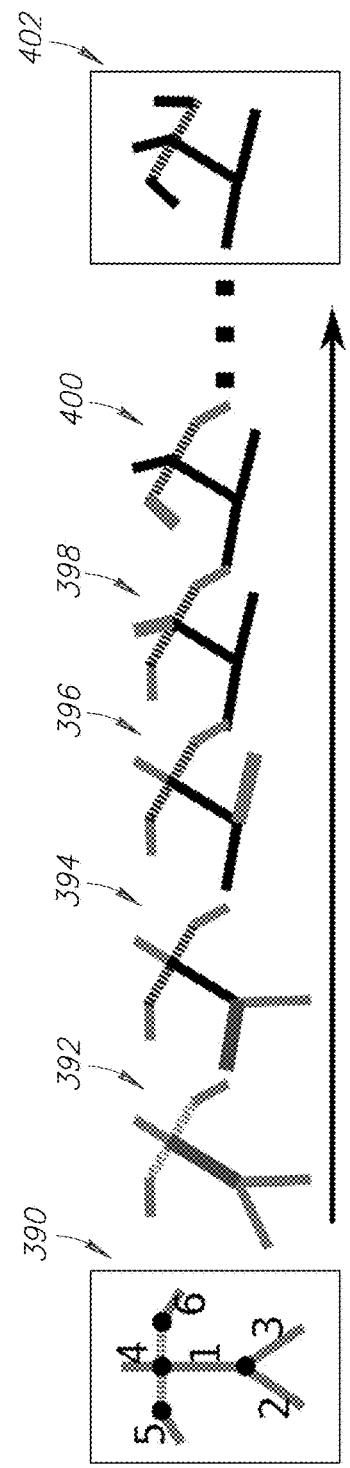
FIG. 7 is a diagram illustrating successive bone rotations for the creation of an example exemplar.

An example generation of an exemplar is shown in FIG. 7. Starting from the rest pose 390, an exemplar is constructed as a set of rigid transformations per bone, where each bone defines a local rotation, which are accumulated along parent-child relations. The concatenated rotations are kept and the translations ensure that the skeleton segments stay connected. Successive bone rotations are shown in 392, 394, 396, 398 and 400 resulting in the final exemplar 402.

With reference to FIG. 5, the weight optimization stage defines the skinning weights, which result in as-rigid-as-possible (ARAP) transformations for the exemplars, by solving, in one embodiment, a least-squares inversion of a linear system (step 126). The solution is found iteratively by optimizing rotation matrices and weights alternatingly (step 128). The method iterates over steps 126, 128, 130 until desired convergence is achieved (step 132). During each iteration, constraints are added to avoid trivial solutions and to ensure weight positivity. Upon convergence, the optimal weights have been determined.

Optional joint optimization is performed in step 130. If performed, it is used to refine the input skeleton's joint positions. Being pivot points, they greatly impact the quality of the resulting transformations. Designing a precise skeleton requires strong artist skills, whereas quadratic-energy optimization of the invention is automatic, a big advantage. Note that when alternating between weight and joint optimizations, each linear system needs to be re-factorized. As changing joints implies changing the exemplars, optimizing joints requires full re-factorization of the linear system involved for the weight optimization. Similarly, optimizing weights requires re-factorizing the linear system involved for the joint optimization.

Example results of the weight and optional joint optimization is shown in FIG. 6F. A deformation example is shown in FIG. 6G.

3 System Initialization

3.1 Weight Initialization

For triangular meshes, weights are initialized using any suitable technique known in the art. For the example illustrated in this document, the technique described in I. Baran and J. Popovic, "Automatic rigging and animation of 3d characters," ACM Transactions on Graphics, vol. 26, ACM 72, 2007, incorporated herein by reference in its entirety, is used. This technique finds the weight vector $w_{\cdot j}:=(w_{0j}, \ldots, w_{N-1,j})^T$ for bone j by solving:

$$-\Delta w_{\cdot j} + H w_{\cdot j} = H \chi_{\cdot j} \qquad (7)$$

where $\Delta$ denotes the square Laplacian matrix, and $\chi_{\cdot j}$ the indicative function of the Voronoi cell of bone j ($v_i \in \text{Vor}(j) \Leftrightarrow \chi_{ij}=1$). H is a diagonal matrix, where $H_{ii}=1/|v_i-p(i)|^2$, if the segment between $v_i$ and its closest point on the skeleton p(i) does not intersect the input mesh (the test is accelerated with a Kd-tree), otherwise $H_{ii}=0$. Consequently, the closest bone has a strong influence (due to H), but the weights are smoothly diffused over the mesh (due to $\Delta$). Two modifications to this algorithm are presented.

Figure 8A:
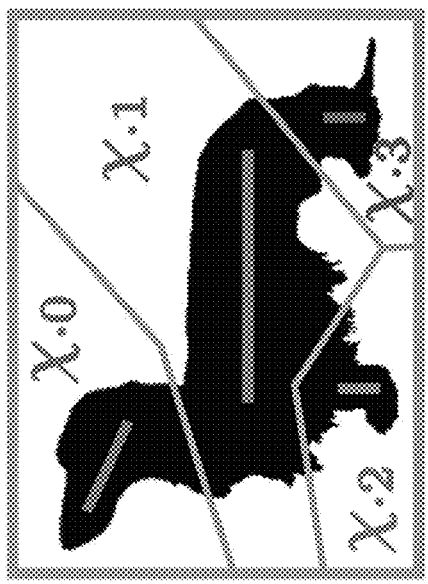
FIGS. 8A and 8B are diagrams illustrating example bone Voronoi cells.
Figure 8B:
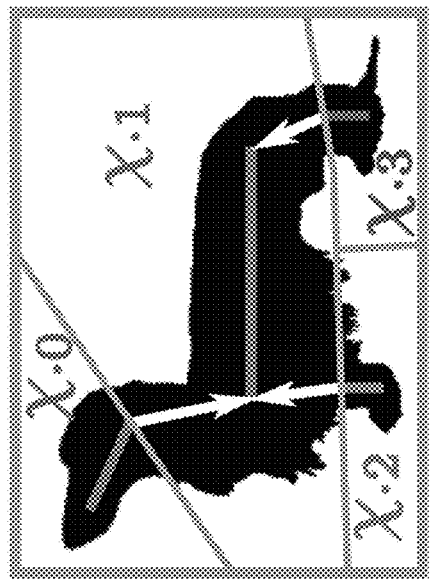
Figure 8C:
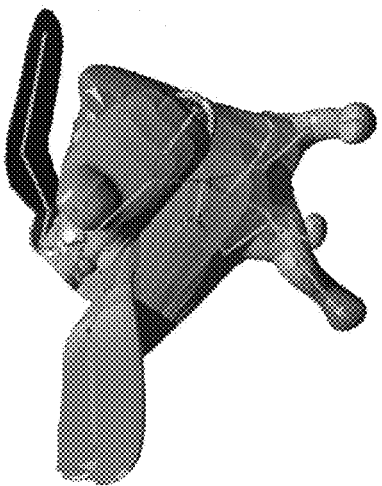
FIGS. 8C and 8D are diagrams illustrating mesh transformations respectively before and after the first iteration of the weight optimization.
Figure 8D:
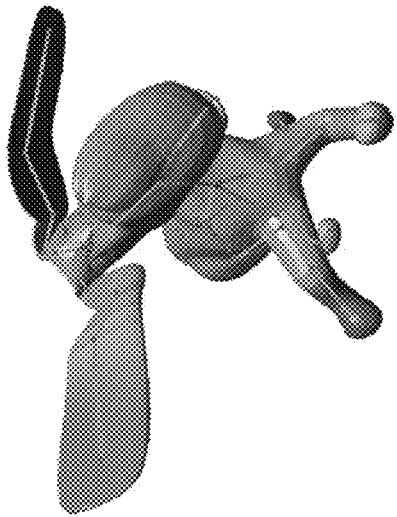

First, support for virtual segments is added. FIG. 8A shows a partitioning using only skeleton bones. The zone of influence of the parent bone is very limited although the child bone's origin is located at the end of the virtual segment. A natural transition near the child's pivot is obtained by making the virtual segments part of the parent bone, thus extending their Voronoi cells as shown in FIG. 8B. FIG. 8C shows that diffusing cell indicators can result in poor initial weights. The results of the algorithm of the present invention that immediately resolves these ambiguities are shown in FIG. 8D.

Second, having disconnected components in the mesh, the linear system (i.e. Equation 7) might become non-invertible (e.g., if a component is invisible from the skeleton). A simple remedy is to set $H_{ii}=1/|v_i-p(i)|^2$, ignoring the intersection test. These weights are not of high quality (as shown in FIGS. 8C and 8D) but serve as a sufficient starting point for the algorithm of the present invention. Note that they do not constitute a local minimum and are improved immediately after the first iteration of the algorithm.

3.2 Bone Influence Reduction

Before optimizing the weights, the set is first rendered sparse to improve locality (useful for editing operations) and computational efficiency. Initially, the bone influence map B(i) for a vertex i is set to all bone indices; any bone potentially influences any vertex. To sparsify the set of weights per vertex i, a bone index j should be removed from B(i) if weight $w_{ij}$ is small.

Most prior art approaches enforce sparsity by adding an energy term using the $l_0$ (or $l_1$, or $l_p$ with p<1) norm involving the variables of the optimization process. Instead, the method of the present invention functions to sparsify the bone influence maps prior to the optimization, which has several advantages:
1. The linear system becomes smaller and sparse, making almost interactive rates possible. It allows adding constraints at any time and providing immediate feedback, which is of utmost importance for user interaction.
2. The topology of the weight maps is easier to control.
3. An artist can use this information to control sparsity and locality. A drawback is that poor initial weights can lead to suboptimal results.

Two important topological properties are maintained during sparsification: (1) Bone topology: From the perspective of bone j, the resulting weight map $\{w_{*j}\}$ should preserve the topology on the mesh (i.e. no extremum is artificially introduced) to make edits consistent; and (2) Vertex topology: From the perspective of vertex i, the set of bones in B(i) should stay fully connected, which is meaningful for the subsequent ARAP minimization described in more detail infra.

In practice, all index pairs (i, j) are processed in increasing order of the associated weights $w_{ij}$. We remove j from B(i) if: (1) at least M bones still have an influence on i (M=2 in all examples); (2) $\Sigma_i w_{ij}$ stays larger than a threshold t (t:=0.9 in all examples); and (3) no local minimum is introduced (i.e. for all adjacent vertices k for which j is in B(k), $w_{kj}$ is larger than $w_{kj}$).

After this pruning, the vertex topology is established in a post process procedure. The skeleton is first converted to a graph SG by collapsing all virtual segments. Then, for each vertex i, the minimal spanning tree in each component of SG is found covering the bones in B(i).

As emphasized in the introduction supra, locality and sparsity are ultimately ill defined, and should be driven by the user, which is why the ability to refine these influence maps $\{B(i)\}$ is provided for, as described in more detail in Section 6.

3.3 Manipulation-Space Sampling

FIG. 9A shows an example constraint dialog from the open source Blender application (blender.org). FIG. 9B is an example of constraint free sampling and FIG. 9C is an example of constraint sampling. To define an exemplar, we start with a random rotation matrix $r_j$ for each bone j by determining a roll axis and a roll and twist value. Typically, this axis is a random axis orthogonal to the bone and the roll value is chosen between 60 and +60 degrees. The twist is a rotation around the bone axis and is restricted between 10 degrees and +10 degrees. Default constraints are used to avoid extreme deformations, which can lead to the candy wrapper effect, for which it is unreasonable to optimize for ARAP deformations. If the skeleton contains definitions for a roll axis, or restrictions on the angles, these are respected in the construction of $r_j$, as shown in FIG. 9C. Regarding spines, their base transformation ($R_s$) is set similarly sampling bones, while the rotation axis (a) is chosen randomly and the spine rotation angle (θ) is taken randomly between −60 and +60 degrees as well. For a virtual segment j, we set $r_j$ to Id.

Next, the global transformation pairs ($R_j$, $T_j$) are derived for each segment j to maintain the skeleton's connectivity. To this extent, all skeleton segments are traversed in a breadth first manner, their global transformation is updated by defining each global translation such that the joint with its parent is preserved after it was affected by the concatenation of all previously encountered bone transformations. Working with local quantities instead of sampling directly is more likely to result in a bias free sampling. Further, skeleton $\{R_j\}$ constraints are often expressed in local frames, which makes their integration relatively easy.

If the skeleton consists of several unconnected components, each component can be treated in any order. This latter case is rare in industrial applications, as a skeleton is usually defined from a root bone with successive children (leading to a fully connected tree). Nonetheless, the method of the present invention is general enough to handle such special cases. The set of all bones and their transformations finally constitutes an exemplar.

4 Weight and Joint Optimization

In order to optimize the weights, the methods of the present invention express the ARAP energy in terms of weights, by inserting Equation 2 into Equation 6. This leads to a quadratic energy, whose minimization results in weights that lead to mesh deformations that best approximate an as-rigid-as-possible (ARAP) behavior. This energy, however, also depends on various matrices {R(i)}, which represent the linear part of the expected transformation for the exemplar at the vertices. Optimizing for these variables at the same time as the weights cannot be easily done. The method alternates between the matrix optimization {R(i)} (referred to as the local step, since each matrix can be optimized independently, see Section 4.1 infra) and the optimization of the weights (referred to as the global step, since they have to be jointly optimized, see Section 4.2 infra). Additional weight constraints (i.e. Section 4.3 infra) are also introduced, which are efficiently injected into the optimization process, to steer the weight derivation. Finally, it is shown that skeleton joint positions can be injected into the ARAP energy as well (see Section 4.4 infra), allowing the optimization of their location via a similar strategy.

4.1 R(i) Refinement (ARAP Local Step)

To derive R(i) for each vertex and each exemplar, Equation 6 is optimized for $$\mathcal{R}(i) = \underset{R \in \mathcal{T}^{adm}}{\operatorname{argmin}} \mathcal{E}_i(f, R) \qquad (8)$$

where $T^{adm}$ is a set of admissible transformations. In the traditional ARAP case, $T^{adm}:=SO(3)$ (the space of 3×3 rotation matrices), for which the solution is obtained by projecting $$\operatorname{Cov}_i := \sum_{k \in V_1(i)} \lambda_{ik} \overline{e}_{ik} \cdot e_{ik}^T$$

onto $T^{adm}$ (e.g., using well-known singular value decomposition techniques).

4.1.1 ARAP for Parameterized Bones

When the bones' length is preserved, the produced deformations should be ARAP. Some of the bone transformations, however, contain stretch. Using the sparsification strategy is sufficient to leverage ambiguities, but optimizing for rotations on stretched transformations can lead to artifacts. A strategy to counter this is to constrain the singular value $\sigma_k$ (with associated singular vector $v_k$, i.e. $\operatorname{Cov}_i=U\Sigma V^T$ and $v_k$ is the $k^{th}$ column of V), based on an analysis of the stretch induced by the bones in the exemplar.

Intuitively, if the bones influencing $v_i$ are stretched, its neighborhood should be stretched as a result, by an amount contained within the range of the stretch values of the bones. Given a bone $j \in B(i)$ with Jacobian J at point $v_i$, $\alpha_k^j:=|J \cdot v_k|$ is computed, the stretch induced by bone j in this direction (if the bone is rigid, then its Jacobian is a rotation and the induced stretch is 1). We then take $\sigma_k:=\Sigma_{j \in B(i)} w_{ij} \alpha_k^j$, thus blending the stretch values induced by the various bones by the weights $\{w_{ij}\}$. Finally, $R(i)=U\operatorname{diag}(\sigma_1, \sigma_2, \sigma_3)V^T$.

Figure 10A:
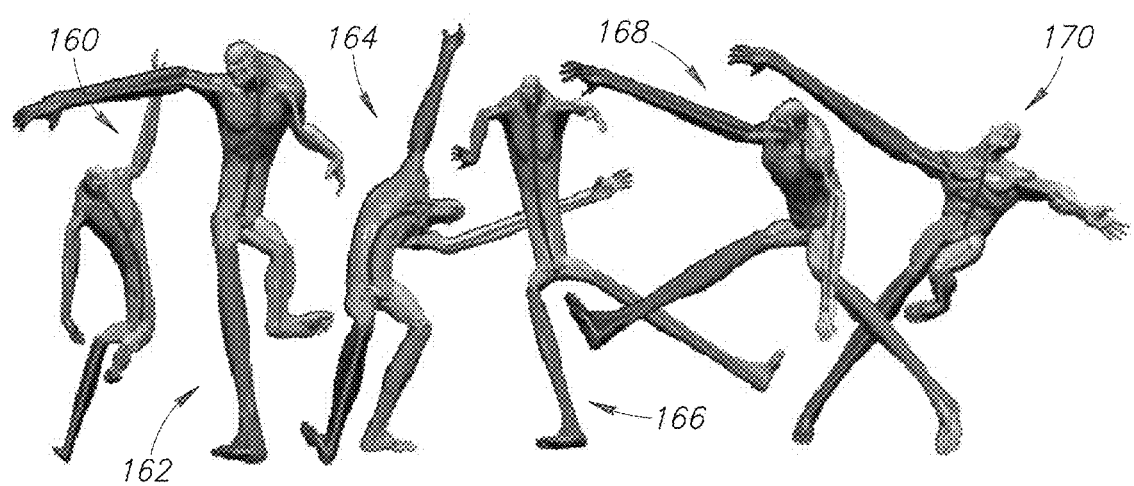
FIGS. 10A and 10B are diagrams illustrating several examples of deformations using stretchable bones and spines.
Figure 10B:
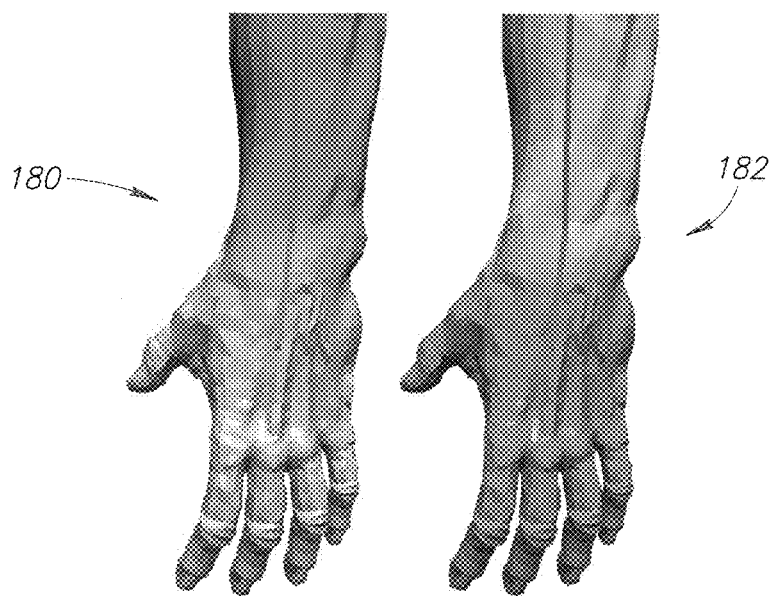

This construction falls back onto the traditional solution if all bones are rigid (i.e. it implies $\sigma_k=1$). Note that no ARAP energy was defined (or adapted) in the literature for anisotropic stretch. Unlike in the traditional rigid case, it is difficult to estimate what values of stretch on the mesh are appropriate, given stretchable controls as input, and no error measure exists for such deformations. The strategy of the present invention was designed to be not only intuitive, but also more efficient than optimizing for rotations, for similarities, for arbitrary matrices (i.e. remaining oblivious to the expected stretch based on the bones), or simply bounding the singular values by the stretch of the bones. It is noted that strategies other than the method of the present invention result in disturbing artifacts and suboptimal optimizations. The results of optimizing with highly stretched-bone exemplars ($\sigma \in [0.5, 4.0]$) are shown in FIGS. 10A and 10B, namely characters 160, 162, 164, 166, 168, 170, and 180, 182.

4.1.2 A Note on Jacobians

For a parameterized bone with transformation given by Equation 3, its Jacobian at point p with parameter u(p) is given by $$J_p = R_s R_{loc}(u(p)) + R_s(R'_{loc}(u(p)) \cdot p + t'_{loc}(u(p))) \cdot \vec{\nabla} u^T \qquad (9)$$

Hence, one needs to compute the gradient $\vec{\nabla} u$. In this document, a linear parameterization is sued, which is defined as a field in $\mathbb{R}$. This parameterization, however, is only weakly differentiable at 0 and 1. Additionally, parameterizations are generally defined as a function on the mesh only (e.g., hand-painted, or resulting from a diffusion equation on the mesh), and their gradient does not have a close form expression. For these reasons, the gradient $\vec{\nabla} u_i$ is estimated at vertex i as $$\vec{\nabla} u_i = \underset{g \in \mathbb{R}^3}{\operatorname{argmin}} \sum_{k \in V_1(i)} \lambda_{ik} \|g^T \cdot \breve{e}_{ik} - (u(v_k) - u(v_i))\|^2, \qquad (10)$$

with $g = \lambda \overrightarrow{e_0 e_1}$.

The derivatives of $R_{loc}(u)$ and $t_{loc}(u)$ are given by:

$$R'_{loc}(u) = \theta \cos(u\theta) a_{[\times]} + \theta \sin(u\theta)(a \cdot a^T - Id) \qquad (11)$$

$$t'_{loc}(u) = -R'_{loc}(u) \cdot e_0 + \sigma \cdot (\cos(u\theta) + u\theta \sin(u\theta))(Id - a \cdot a^T) \cdot \overrightarrow{e_0 e_1} + \sigma \cdot (u\theta \cos(u\theta) - \sin(u\theta)) a \times \overrightarrow{e_0 e_1} + (\sigma - 1) R_{loc}(u) \cdot \overrightarrow{e_0 e_1} + u \cdot (\sigma - 1) R'_{loc}(u) \cdot \overrightarrow{e_0 e_1}, \qquad (12)$$

noting $a_{[\times]}$ the 3×3 matrix such that $a_{[\times]} \cdot v = a \times v, \forall v \in \mathbb{R}^3$.

4.2 Weight Optimization (ARAP Global Step)

How to produce an initial set of weights and how to compute an optimal set of transformation matrices $\{R(i)\}$ from the weights have been described supra. Next, the global step; optimizing the weights while keeping the transformations constant will be described. Let $B(i):=\{b_i^0, b_i^1, \ldots, b_i^{N_i-1}\}$ be the bone influence for vertex i, which is thus influenced by $N_i$ bones. Let w be the vector of length $|w|=\Sigma_i(N_i-1)$ concatenating the weights $w_{ij}$, which we want to solve for, ordered by increasing indices i and j, but ignoring the first weight of each vertex:

$$w = (w_{0b_0}^1, \ldots, w_{0b_0}^{N_0-1}, w_{1b_1}^1, \ldots, w_{1b_1}^{N_1-1}, \ldots) \qquad (13)$$

First consider a single exemplar (for readability we avoid indexing the various quantities). Defining $\phi_i^j := R_{b_i^j}(v_i) \cdot v_i + T_{b_i^j}(v_i)$ as the transformation of vertex i by the $j^{th}$ influencing bone, Equation 2 can be rewritten as:

$$\overline{v}_i = \sum_{j=0}^{N_i-1} w_{ib_i^j} \phi_i^j = \sum_{j=1}^{N_i-1} w_{ib_i^j} \phi_i^j + \left(1 - \sum_{j=1}^{N_i-1} w_{ib_i^j}\right) \phi_i^0 = \qquad (14)$$

$$\sum_{j=1}^{N_i-1} w_{ib_i^j} (\phi_i^j - \phi_i^0) + \phi_i^0 =: \Phi_i \cdot w + \phi_i^0.$$

Note that matrix $\Phi_i \in \mathbb{R}^{3,|w|}$ is sparse and only contains entries organized in a block for vertex i. Based on this expression for a single vertex, an expression of a transformed edge can be deduced $\overline{e}_{ik} = \Phi_{ik} \cdot w + \phi_{ik}$, where $\Phi_{ik} := \Phi_k - \Phi_i$ and $\phi_{ik} := (\phi_k^0 - \overline{\phi}_i^0)$. This expression can be inserted into the equation for ARAP energy (Equation 6) to obtain an expression in the weights. Given an exemplar ex, the following is obtained:

$$\mathfrak{E}(w, \mathcal{R}) = w^T \cdot Q^A(ex) \cdot w - 2Q^B(ex)^T \cdot w + const, \text{ with} \quad (15)$$

$$Q^A(ex) := \sum_{i \in \mathcal{V}} \Lambda_i \sum_{k \in V_1(i)} \lambda_{ik} \Phi_{ik}^T \cdot \Phi_{ik}$$

$$Q^B(ex) := \sum_{i \in \mathcal{V}} \Lambda_i \sum_{k \in V_1(i)} \lambda_{ik} \Phi_{ik}^T \cdot (\mathcal{R}(i) \cdot e_{ik} - \phi_{ik})$$

Figure 11:
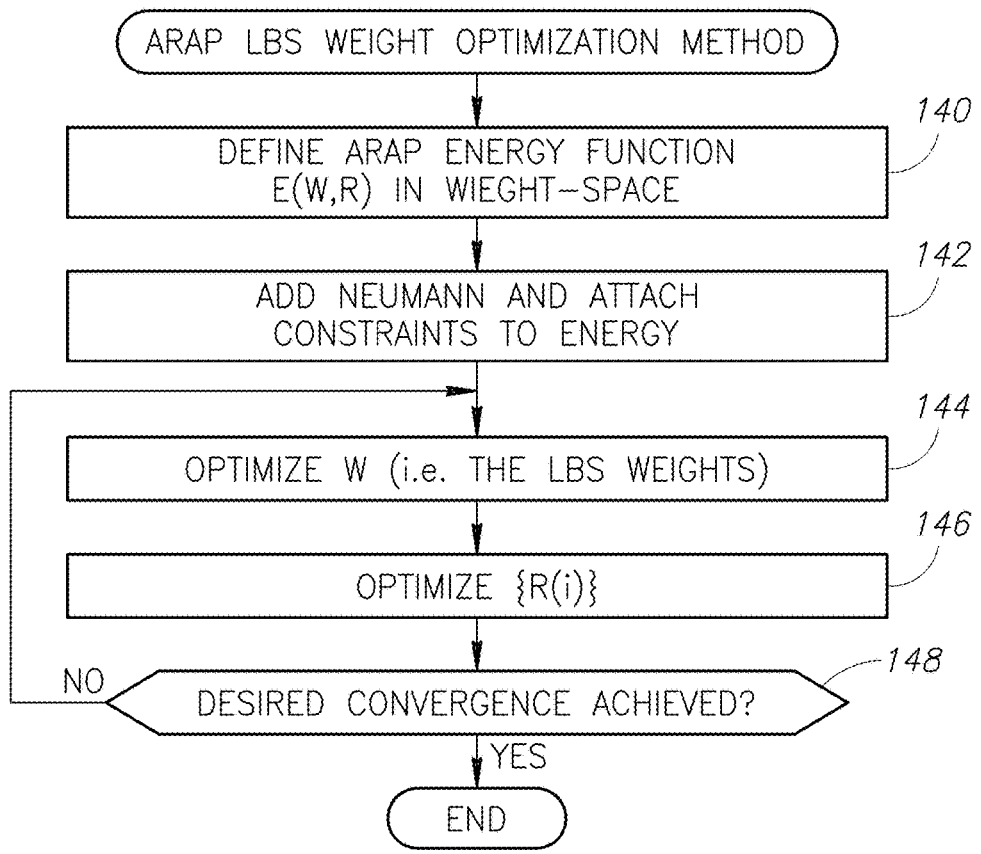
FIG. 11 is a flow diagram illustrating an example as-rigid-as-possible (ARAP) linear blend skinning (LBS) weight optimization method of the present invention.

A flow chart illustrating the weight optimization method is shown in FIG. 11. First, the ARAP energy function $\mathfrak{E}$ (w, $\mathcal{R}$) is defined in weight space (as described above) (step 140). The method then adds Neumann and attach constraints (see section 4.3) to the energy (step 142). The method then performs a one-step optimization of w (i.e. the LBS weights) (step 144). The method then performs a one-step optimization of $\{R(i)\}$ (step 146). The method repeats with step 144 until the desired convergence is achieved (step 148).

Figure 12:
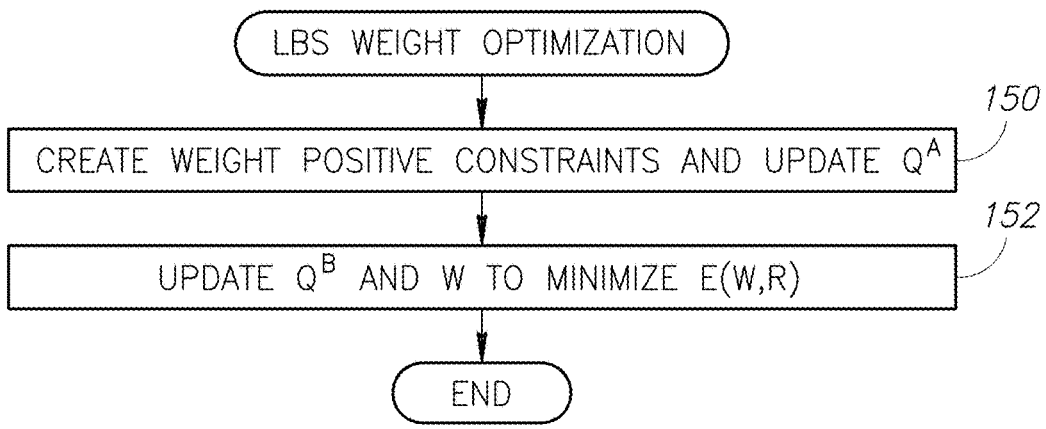
FIG. 12 is a flow diagram illustrating an example linear blend skinning (LBS) weight one-step optimization method of the present invention.

A flow chart detailing the one-step optimization of the weights is shown in FIG. 12. First, the weight positivity constraints are created (see Positivity constraints in section 4.3) and $Q^A$ is updated (step 150). Then, $Q^B$ and w are updated to minimize $\mathfrak{E}$ (w, $\mathcal{R}$) (step 152).

A flow chart illustrating an overview of an example LBS weight optimization method is shown in FIG. 11. First, the weight constraints are created and $Q^A$ is updated (step 140). The, QB and w are updated to minimize $\mathfrak{E}$ (w, $\mathcal{R}$) (step 142). The per-vertex transformation matrices $\Phi_{ik}$ are then optimized (step 144). The weight optimization is the iterated until the desired level of convergence is achieved (step 146).

A flow chart illustrating an example ARAP optimization method is shown in FIG. 12. First, the ARAP energy function $\mathfrak{E}$ (w, $\mathcal{R}$) is defined (as described above) (step 150). The method then optimizes $f$ for w (i.e. the LBS weights) (step 152). Note that in one embodiment, this step requires the minimization of a quadratic energy with the weights as variables (i.e. invert a linear system to the least-squares sense). Once the weights are optimized, the method optimizes for R(i) (step 154). Note that this step can be performed for each vertex separately. The method repeats with step 152 until the desired convergence is achieved (step 156).

4.2.1 Multiple Exemplars

For a reasonable deformation behavior, several exemplars are involved (preferably a few tens or hundreds) to well cover the manipulation space. Fortunately, adding exemplars does not induce substantial memory costs since all matrices $\{Q^A(ex)\}$ have the same pattern; the ARAP energy for all exemplars in weight space can be expressed as $$\mathfrak{E} := (w, \mathcal{R}) := w^T \cdot Q^A \cdot w - 2Q^{B^T} \cdot w + const \quad (16)$$

with $Q^A := \Sigma_{ex} Q^A(ex)$ and $Q^B := \Sigma_{ex} Q^B(ex)$. The optimal weights under the linearity constraint are thus given by $$w^* = \underset{w}{\operatorname{argmin}} \mathfrak{E}(w, \mathcal{R}) = Q^{A\dagger} \cdot Q^B \quad (17)$$

4.3 Weight Constraints

In principle, the optimization process is complete, but by introducing additional constraints, it is possible to steer the optimization to improve quality. These weight constraints are defined in form of a supplementary error term added to $\mathfrak{E}$ (w, $\mathcal{R}$):

$$\mathfrak{E}(w, \mathcal{R}) \leftarrow \mathfrak{E}(w, \mathcal{R}) + \sum_{(i,j,\hat{w}_{ij}) \in Constraints} c_i |w_{ij} - \hat{w}_{ij}|^2, \quad (18)$$

where $\hat{w}_{ij}$ is a value, which is softly enforced on weight $w_{ij}$ and $c_i$ is a scaling factor to control its impact. In all examples presented herein, $c_i := 100 \cdot BDD^2 \cdot \Lambda(i) \cdot \#\{ex\}$, where BDD is the bounding box diagonal (to ensure that value ranges are compatible), the vertex weight $\Lambda(i)$ (to take the vertex density into account), and the number of exemplars $\#\{ex\}$ (to keep the constraints independent of the manipulation-space sampling).

Attach constraints are used to maintain a strong attachment for vertices whose initial weight estimate for a bone is maximal. Especially extremities of a skeleton that would otherwise be ignored; attaching vertices only to a parent bone would have a similar rigidity advantage as attaching all vertices to a single bone. The initial weight estimates (before the first iteration) can be used to identify such important skeleton connections; we set $\hat{w}_{ij} = 1$ if (1) $w_{ij}$ is a strict local maximum at i with respect to the neighboring vertices (because a single attachment is sufficient); (2) $w_{ij} > 0.5$ (because only strong influences should be considered); and (3) j is visible from i. Note that, for a volumetric weight optimization, it means setting these constraints on the bones.

Neumann constraints are used to ensure that weights of a bone j fade out smoothly where the influence of j disappears. Consequently, we set $\hat{w}_{ij} = 0$ if a neighboring vertex of i is not influenced by bone j. Note that we call it a Neumann constraint because it enforces a null gradient on the boundary.

Positivity constraints are used to ensure that the resulting weights satisfy the positivity constraint. In practice, we achieve this goal by adding after each iteration a constraint with $\hat{w}_{ij} = 0$, if a weight $w_{ij}$ becomes negative and is a local minimum. In this way, negative weights are drastically reduced and hard constraints are avoided, while introducing only a sparse set of constraints. In all results presented herein, the resulting performance overhead is barely noticeable when updating the factorization.

Mixed-weight constraints are optional and, if requested by the user, are used to bound areas of the mesh to following other strategies than ARAP by setting $\hat{w}_{ij}$ to the desired weight value.

Note that adding and removing weight constraints can be realized efficiently because a re-factorization of matrix $Q^A$ is unnecessary. By using low-rank Cholesky factorization updates, the computation is significantly accelerated by several orders of magnitude.

4.4 Joint Optimization

Artists tend to produce skeletons reflecting the desired degrees of freedom to best serve their animation needs, but fine-tuning operations should not be required. Consider a skeletal chain inside a cylinder (e.g., the arm of a character), here, the bones should lie close to the medial axis to minimize stretch. Similarly, joints (i.e. vertices connected to at least two segments) would be best placed at the centers of the intended articulations, which can also be cumbersome to do. This section presents an automatic optimization of the skeletal joints, which in turn leads to better skinning results as well.

The motivation for joint optimization is that it is fairly simple enough to place the joints for fingers, elbows, etc. but it is much more challenging to correctly place the joints for shoulders, hips, etc. The position of the joint defines a pivot point and has influence over the rotation and translation applied by the bones to the mesh vertices. It therefore has influence over the final transformation of the mesh. The present invention provides a mechanism to optimize the placement of the joints, such as the corresponding skeleton transformations (for given LBS weights), that results in ARAP transformations of the mesh (i.e. that minimize the ARAP energy function). Thus, joint optimization depends on (1) LBS weights, and (2) given skeleton transformations for which the mesh reconstruction is optimized.

If the rotation of the bones is maintained, a linear relationship can be defined between the joint positions and the translation of the bones. This is achieved by the constraint that the bones are connected at the joints when they are rotated. The rotation $R_j$ of bone j is fixed and the translation $T_j$, is allowed to vary. The joint positions can be inserted in the place of $T_j$, in the energy expression, e.g., the ARAP energy function described supra, which defines the quality of the deformation of a mesh. Note that any expression for the energy function can be used as the joint optimization is not limited to using only the ARAP energy expression described herein. The joint positions are optimized in such a way that improvement of the quality of the mesh transformation is now possible. The inputs to the algorithm are the LBS weights (fixed) and the skeleton transformations from the manipulation space (rotations are fixed, translations are optimized).

When changing joints of the binding skeleton, the essence of the exemplars is retained; defined by rotations of the bones and additional quantities ($\sigma$, $\theta$, a) for spines. In Section 3.3 discussed supra, the bones' translations were derived by marching on the skeleton while ensuring that the bones stayed connected at the joints. This construction can be expressed in terms of a linear dependency linking the joint positions of the binding skeleton and the bone translations in the exemplars, allowing the joint positions to be plugged into the ARAP energy and thus derive joint displacements $\{\partial J_k\}$ minimizing the ARAP energy.

Figure 13:
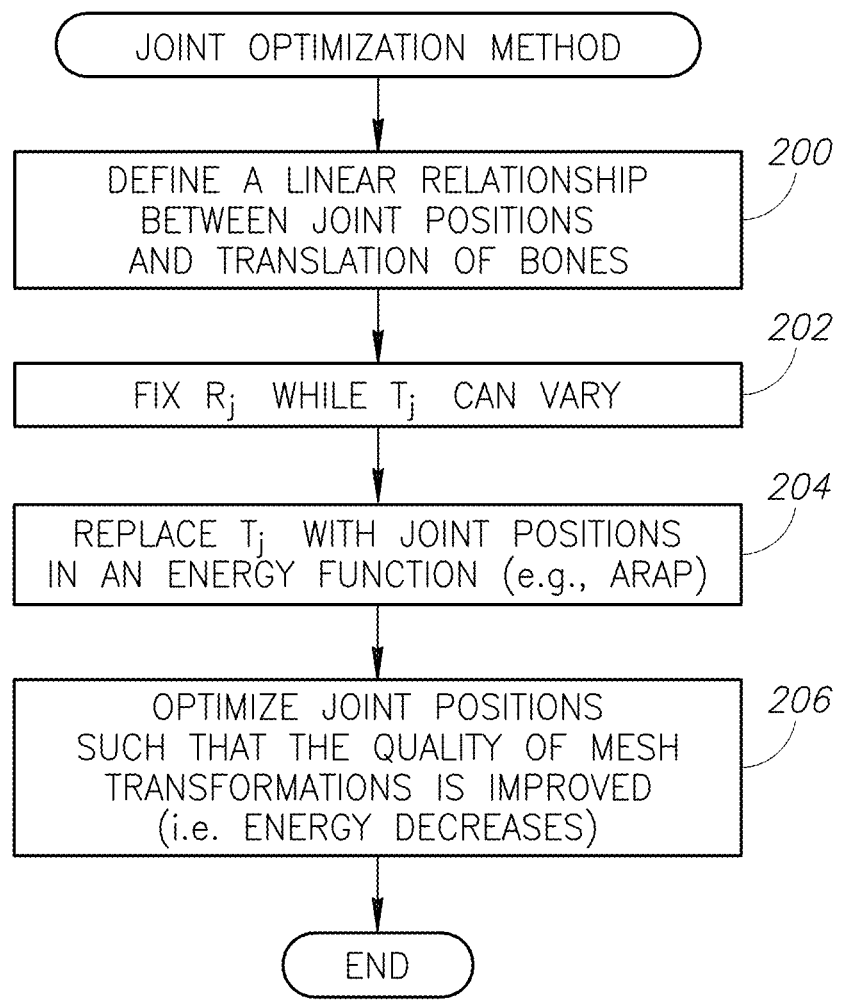
FIG. 13 is a flow diagram illustrating an example joint optimization method of the present invention.

A flow chart illustrating an example joint optimization method of the present invention is shown in FIG. 13. First, a linear relationship is defined between joint positions and the translations of bones (step 200). The method then fixes $R_j$ while allowing $T_j$ to vary (step 202). The method then replaces $T_j$ with joint positions in an energy function (e.g., energy entity, ARAP energy function, etc.) (step 204). Then the joint positions are optimized such that the quality of the mesh transformations is improved (i.e. the energy decreases) (step 206). The details of this method are described in more detail infra.

4.4.1 Algebraic Exemplar Construction

In one embodiment, the goal is to express bone translations in terms of joint displacements for the binding skeleton. Thus, the joints are adapted and the other parameters (e.g., rotations) of the exemplar are maintained. First, a pair of rigid bones (i, j) connected by a joint k and a displacement $\partial J_k$ are investigated, before addressing different components of the skeleton. As the joint is located between two skeletal segments, applying either one of their transformations on the joint should yield the same result. Mathematically, this condition implies the following:

$$R_i^{ex} \cdot (J_k + \partial J_k) + (T_i^{ex} + \partial T_i^{ex}) = R_j^{ex} \cdot (J_k + \partial J_k) + (T_j^{ex} + \partial T_j^{ex}) \quad (19)$$

Observing that the skeleton transformations $\{R_i^{ex}, T_i^{ex}\}$ and $\{R_j^{ex}, T_j^{ex}\}$ in ex were constructed similarly, $(R_i^{ex} \cdot J_k + T_i^{ex} = R_j^{ex} \cdot J_k + T_j^{ex})$, to maintain connectivity (see Section 3.3 supra), the following is obtained:

$$\partial T_j^{ex} - \partial T_i^{ex} = (R_i^{ex} - R_j^{ex}) \cdot \partial J_k \quad (20)$$

We note this joint constraint JointConst$(i,j,k)^{ex}$.

Note, that if spines are used, this construction is more complicated. For a spine s with extremities ($e_0$, $e_1$) and deformation parameters ($R_s$, $t_s$, $\sigma$, $\theta$, a) in the exemplar, the deformation of extremity $e_0$ will be $\bar{e}_0 = R_s \cdot e_0 + t_s$ (similar to before) but the deformation of extremity $e_1$ will be $\bar{e}_1 = R_s \text{Rot}(a, \theta) \cdot e_1 + R_s A(1) \cdot e_0 + R_s B(1) \cdot e_1 + t_s$ (by rewriting $t_{loc}(u) =: A(u) \cdot e_0 + B(u) \cdot e_1$, see Equation 5). In short, the fact that $\bar{e}_1$ depends both on $e_0$ and on $e_1$ changes the right side of JointConst(i, j, k) in case bone i (or j) is a spine and joint k is its positive extremity (i.e. $e_1$). JointConst(i, j, k)$^{ex}$ then contains not only products of matrices by $\partial J_k$, but also products of matrices by $\partial J_{k'}$, joint k' being the negative extremity of the spine (i.e. $e_0$). Otherwise, the construction remains the same and valid.

If the skeleton is not fully connected, joint constraints are insufficient to express $\{\partial T_j^{ex}\}$ in terms of $\{\partial J_k\}$; assume that a constant displacement is added to every skeletal segment of a connected component, then the joint constraints would still be preserved. Consequently, auxiliary variables $\partial C_c^{ex}$ are introduced, one for each connected component c, which reflects an average component displacement. The resulting component constraints, which are denoted ComponentConst$(c)^{ex}$, are given by:

$$\frac{\sum_{i \in \text{Component}(c)} \partial T_i^{ex}}{\#\text{Component}(c)} = \partial C_c^{ex}. \quad (21)$$

Using joint and component constraints, a linear relationship is defined to express the change of the skeletal segment translations $\{\partial T_j^{ex}\}$ for a set of joint displacements $\{\partial J_k\}$ and average component displacements $\{\partial C_c^{ex}\}$. To this extent, each connected component c of the skeleton was processed successively. Each joint k in c is then processed successively as well. Let $\{s_0, \ldots, s_n\}$ be k's adjacent skeletal segments. A constraint JointConst$(s_0, s_i, k)^{ex}$ for all i>0 is then added. Note that having each constraint rely on $s_0$ is irrelevant because the expression of $\{\partial T_j^{ex}\}$ in terms of $\{\partial J_k\}$ and $\{\partial C_c^{ex}\}$ is already unique with the linear system. Once all joint constraints of c are collected, the component constraint ComponentConst$(c)^{ex}$ is added and processing proceeds with the next connected component.

The resulting set of equations can be written in matrix form as follows:

$$M \cdot \partial T^{ex} = (M_J^{ex}, M_C^{ex}) \cdot \begin{bmatrix} \partial J \\ \partial C \end{bmatrix}. \quad (22)$$

where $\partial J := (\partial J_0, \ldots, \partial J_n)^T$ and $\partial C = (\partial C_0^{ex}, \ldots, \partial C_m^{ex})^T$ are the concatenations of the displacement variables for the n joints and m connected components of the skeleton. The entries of M, $M_J^{ex}$ and $M_C^{ex}$ follow directly from the above constraints. $M_J^{ex}$ is relatively simple, consisting mostly of zeros and a few differences of 3×3 rotation matrices. M and $M_C^{ex}$ also have a simple structure, which becomes apparent when reordering the joint indices. If it is assumed that they are sorted such that joints are grouped by connected components in the skeleton, both matrices become diagonal block matrices, as shown in blocks 190, 192, 194 of FIG. 14. This property makes it easy to invert M. In the following, this joint ordering is assumed.

Given the above observations, a linear relation between $(\partial J, \partial C)$ and $\partial T^{ex}$ can be produced as follows:

$$\partial T^{ex} = M^{-1} \cdot (M_J^{ex}, M_C^{ex}) \cdot \begin{bmatrix} \partial J \\ \partial C \end{bmatrix} \quad (23)$$

where $\partial T^{ex}$ is a matrix of skeletal-segment translations for an exemplar, M is a matrix describing the topology of the skeleton, $M_J^{ex}$ is a joint constraint matrix, $M_C^{ex}$ is a component constraint matrix, $\partial J$ is a concatenation of displacement variables for joints of the skeleton and $\partial C$ is a concatenation of displacement variables for connected components of the skeleton.

One should not assume that the above equation is a one-to-one relationship between joints and bones. In general, $M^{-1} \cdot (M_J^{ex}, M_C^{ex})$ is not invertible. Nonetheless, Equation 23 allows us to correctly adapt the translations of the provided exemplar to maintain its original rotations despite the additional joint displacement.

4.4.1.1 Multiple Exemplars

Figure 14:
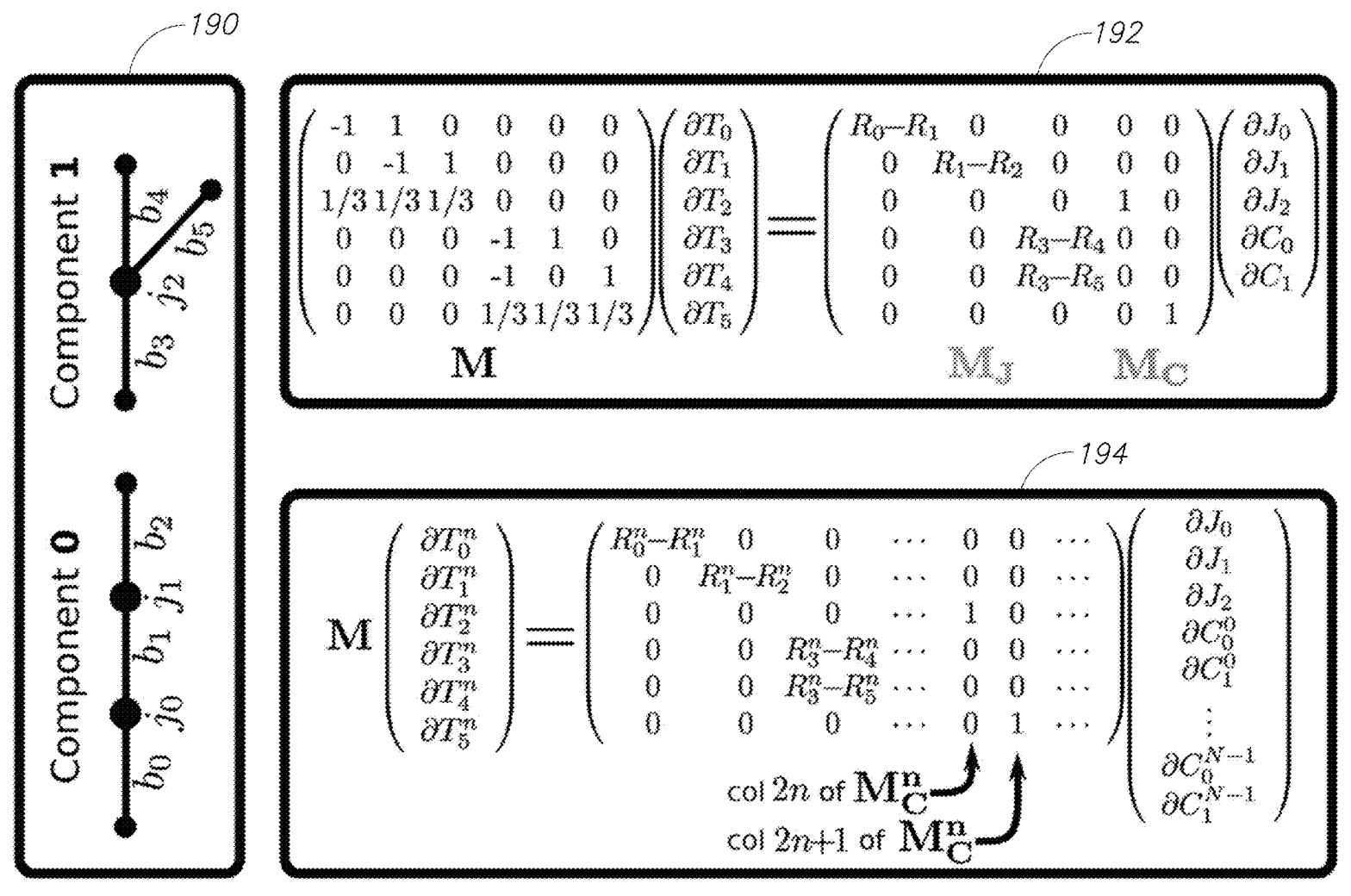

For each exemplar, following the case of a single exemplar, one auxiliary variable is added for each connected component, while the joint displacements are shared and globally defined. In consequence, each exemplar enlarges $M_C^{ex}$ to reflect all bone translations and all average component displacements over all exemplars. Block 194 of FIG. 14 illustrates the extended form of $M_C^{ex}$ and the corresponding displacement vector, which is similarly extended to hold the average component displacements over all exemplars.

4.4.2 Skeletal Joint Optimization (ARAP Global Step)

Expressing the bone displacement via the joint displacement, allows us to link it to the mesh. Injecting into the ARAP energy term, makes it possible to measure the impact of joint displacements on the ARAP energy. We first observe that $\partial T^{ex}$ leads to an offset $\partial \bar{v}_i^{ex}$ for the LBS of a vertex i (Equation 2):

$$\partial \bar{v}_i^{ex} = \sum_{j \in B(i)} w_{ij} \partial T_j^{ex}(v_i). \quad (24)$$

$R_j(v_i)$ does not appear in the previous expression because modifying the position of the joints or changing the translation part of the bones (either the standard bones or the translation of the base of the spines) does not change it.

For standard bones, the change of the translation applied to vertex i by bone j($\partial T_j^{ex}(v_i)$) is $\partial T_j^{ex}$, and one can use Equation 23 to express $\partial T_j^{ex}(v_i)$ in terms of $(\partial J, \partial C)^T$.

For a spine s with extremities ($e_0$, $e_1$) and deformation parameters ($R_s$, $t_s$, $\sigma$, $\theta$, $a$) in the exemplar ex, more care is needed. Since the transformation induced by the spine is $p \mapsto R_s R_{loc}(u(p)) \cdot p + R_s \cdot t_{loc}(u(p)) + t_s$, the change of the translation applied to vertex i by bone j ($\partial T_s^{ex}(v_i)$) is not simply $\partial t_s$, because $t_{loc}(u)$ depends on $e_0$ and $e_1$ as well. As before, we rewrite $t_{loc}(u) := A(u) \cdot e_0 + B(u) \cdot e_1$, leading to $\partial T_s ex(v_i) = R_s A(u(v_i)) \cdot \partial e_0 + R_s B(u(v_i)) \cdot \partial e_1 + \partial t_s$. Using Equation 23 to express $\partial t_s$ in terms of $(\partial J, \partial C)^T$, $\partial T_j^{ex}(v_i)$ can be expressed in terms of $(\partial J, \partial C)^T$ for spines (and therefore for twistable and stretchable bones) as well.

Consequently, we can also compute the effect on an edge $\bar{e}_{ik}^{ex}$ and obtain again an offset $\partial \bar{e}_{ik}^{ex}$, which is given by the following:

$$\partial \bar{e}_{ik}^{ex} = \sum_{j \in B(k)} w_{kj} \partial T_j^{ex}(v_k) - \sum_{j \in B(i)} w_{ij} \partial T_j^{ex}(v_i) =: \partial \Omega_{(i,k)}^{ex} \cdot \begin{bmatrix} \partial J \\ \partial C \end{bmatrix}, \quad (25)$$

where $\partial \Omega_{(i,k)}^{ex}$ is a horizontal vector of block matrices.

Combining this result with the ARAP energy (Equation 16) yields the following:

$$\mathfrak{E}\left(\begin{bmatrix} \partial J \\ \partial C \end{bmatrix}, \mathcal{R}\right) = \sum_{ex} \sum_{i \in \mathcal{V}} \Lambda_i \sum_{k \in V_1(i)} \lambda_{ik} \|\partial \bar{e}_{ik}^{ex} - (\mathcal{R}(i)^{ex} \cdot e_{ik} - \bar{e}_{ik}^{ex})\|^2 \quad (26)$$

where E is the energy entity, $\partial J$ is a concatenation of displacement variables for joints of the skeleton and $\partial C$ is a concatenation of displacement variables for connected components of the skeleton, ex represents an exemplar, $R(i)^{ex}$ s a matrix constraining the transformation of the 3D edges incident to vertex i in exemplar ex, V are mesh vertices, $V_1(i)$ is the set of vertices connected to vertex i, $\Lambda_i$ is an input vertex weight and $\lambda_{ik}$ is an input weight for directed edge $e_{ik}$.

This last equation finally expresses the ARAP energy in terms of $(\partial J, \partial C)^T$. Using a minimization of the corresponding quadric, we can thus solve for an optimal skeletal joint placement. It is noted that for some complex configurations, this energy is not always positive definite, so we regularize and minimize: $\mathfrak{E}((\partial J, \partial C)^T, \mathcal{R}) + \|\mathcal{E}_{\mathcal{J}} \cdot (\partial J, \partial C)^T\|^2$, $\mathcal{E}_{\mathcal{J}}$ block-diagonal matrix where the $i^{th}$ block penalizes large offsets for the $i^{th}$ variable. The quadric to minimize for the joint positions is:

$$\begin{bmatrix} \partial J \\ \partial C \end{bmatrix}^T \cdot Q_{\mathcal{J}}^A \cdot \begin{bmatrix} \partial J \\ \partial C \end{bmatrix} - 2 Q_{\mathcal{J}}^{B^T} \cdot \begin{bmatrix} \partial J \\ \partial C \end{bmatrix} + const \quad (27)$$

with $$\begin{cases} Q_{\mathcal{J}}^A := \sum_{ex} \sum_{i \in \mathcal{V}} \Lambda_i \sum_{k \in V_1(i)} \lambda_{ik} \partial \Omega_{(i,k)}^{exT} \cdot \partial \Omega_{(i,k)}^{ex} + \varepsilon_{\mathcal{J}}^T \cdot \varepsilon_{\mathcal{J}} \\ Q_{\mathcal{J}}^B := \sum_{ex} \sum_{i \in \mathcal{V}} \Lambda_i \sum_{k \in V_1(i)} \lambda_{ik} \partial \Omega_{(i,k)}^{exT} \cdot (\mathcal{R}(i)^{ex} \cdot e_{ik} - \bar{e}_{ik}^{ex}) \end{cases} \quad (28)$$

In the implementation described herein, joint tangential displacement is penalized more severely than joint non-tangential displacement and connected component displacements. In another embodiment, an attachment term is added to the quadric to restrict the initial joint positions. Further, the user can tune relative joint displacements, by providing a joint-material scalar function, influencing the norm of the $i^{th}$ block of $\mathcal{E}_{\mathcal{J}}$. Note, that after each solver iteration, each exemplar ex needs to be updated (the translations of the bones) using Equation 23. Nonetheless, the user is free to refine the various matrices $\{R(i)^{ex}\}$ the linear part $Q_{\mathcal{J}}^{B}$, or refine the joints without changing the factorization of $Q_{\mathcal{J}}^{A}$. As already mentioned, however, changing the joint positions results in an un update of the skeleton deformation exemplars. It is thus required to update the matrix $Q^A$ and to re-factorize it before further optimizing the weights again.

5 Algorithmic Details

5.1 Vertex and Edge Weights

While $\Lambda_i$ and $\lambda_{ik}$ are often defined via Voronoi-cell areas and cotangent weights, such weights lead to severe artifacts because negative values can occur for triangles exhibiting obtuse angles and the ARAP minimization would maximize the rigidity error of the concerned edges. Instead, the initialization of the method of the present invention uses barycentric cell-area weights, which guarantee initial positive values. Further, their sum results in the total mesh area, which can be seen as a discretization of a continuous formulation and increases robustness.

5.2 Local Maxima and Positivity

Other than weight constraints for negative local minima (i.e. penalized during optimization; see Section 4.3), we do not strictly ensure positivity in the system because negative weights are mostly avoided. They would produce distorted transformations, which contradict the goal of the final weights to opt for ARAP transformations. Therefore, performance is improved drastically. FIGS. 15A and 15B show this observation. Negative weights (depicted in oval 211) might occur for a small number of exemplars (e.g., 8, character 210) but are drastically diminished when a larger number of exemplars (e.g., 32, character 212) is used. Note that, for illustration purposes, the examples use no weight constraints.

Similarly, local maxima in the weights can lead to serious artifacts and prior art techniques propose to detect and suppress non-global extrema (i.e. constrain the value to 0 or 1). In the method of the present invention, although small local extrema are observed that arise when optimizing for ARAP transformations, a one-step Laplacian filtering (including a re-normalization) after each optimization iteration is sufficient to avoid artifacts. This result illustrates that the ARAP-transformation optimization of the present invention provides previously artificially-enforced properties.

5.3 Vertex-Clustering Acceleration

Following Section 4.1, for each exemplar and iteration, updating $R(i)$ requires a large number of costly 3×3 matrix singular value decompositions to be performed per vertex. Nonetheless, the transformations should ultimately be smooth, which implies that the matrices will vary smoothly as well. Consequently, this step can be accelerated using vertex clustering.

Figures 16B, 16C:
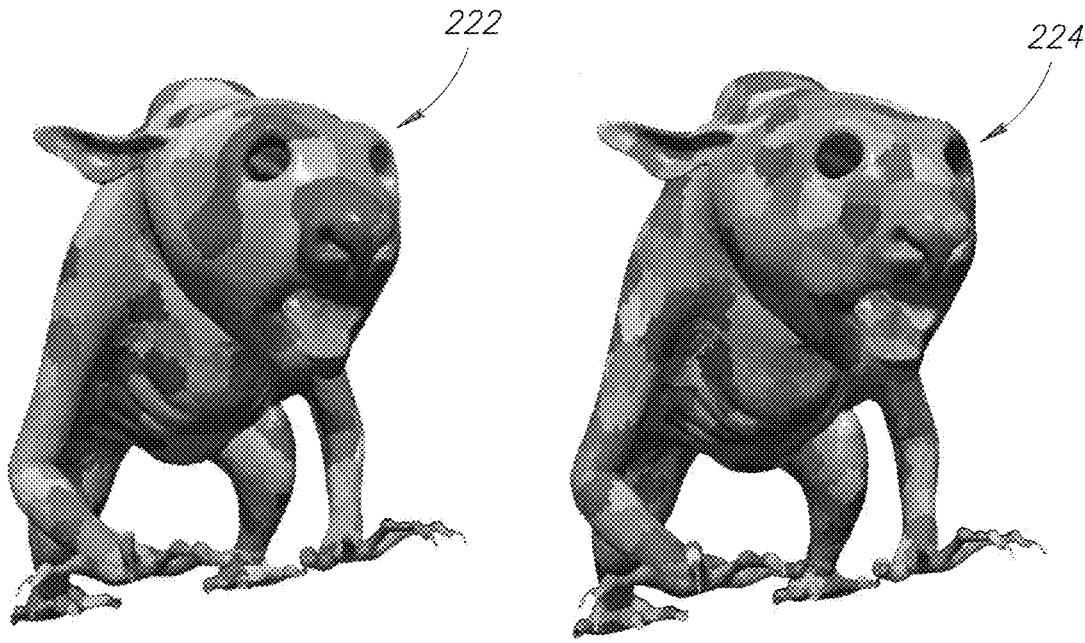

In order to avoid clustering effects in the output, a set of clusterings is computed and each exemplar is associated with a random clustering (e.g., 10 clusterings on the positions, with a number of clusters taken randomly between 1000 and 5000). To obtain uniform clusterings despite anisotropy in the input mesh, a variant of k-means++ is used, and vertex $v_i$ is selected as seed $s_n$ with relative probability area$(v_i)$*d² $(v_i,\{s_j\}_{j<n})$. Characters 220, 222, 224 in FIGS. 16A, 16B and 16C show clusterings of various sizes that are uniform, despite the anisotropic vertex distribution.

For a given exemplar and clustering, the transformation matrices for cluster cl is estimated as follows:

$$\mathcal{R}(cl) = \underset{R \in \mathcal{T}^{adm}}{\operatorname{argmin}} \sum_{i \in cl} \Lambda_i \sum_{k \in V_1(i)} \lambda_{ik} \|\bar{e}_{ik} - R \cdot e_{ik}\|^2 \tag{29}$$

Specifically, the cluster covariance is computed as $$\sum_{i \in cl} \Lambda_i \sum_{k \in V_1(i)} \lambda_{ik} \bar{e}_{ik} \cdot e_{ik}^T =: U\Sigma V^T,$$

and the stretch $\sigma_k$ in direction $v_k$ is set as $$\sigma_k = \sum_{i \in cl} \sum_{j \in B(i)} \Lambda_i w_{ij} |J_{ij} \cdot v_k| \Big/ \sum_{i \in cl} \sum_{j \in B(i)} \Lambda_i w_{ij} \tag{30}$$

($J_{ij}$ being the Jacobian of bone j at point $v_i$ in the exemplar). Finally, the cluster's matrix is set to $R(cl)=U\operatorname{diag}(\sigma_1, \sigma_2, \sigma_3)V^T$, and each vertex i in the cluster cl is associated with this matrix, i.e. $R(i)=R(cl)\forall i \in cl$.

6 Skinning Tools

The method of the present invention is operative to respect linearity and positivity constraints. The desired locality, however, is often subjective. Preferably, it is based on user preferences, for which in one embodiment several tools are provided in the form of brushes, which allow the user to easily indicate additional constraints interactively. Note that in the examples presented herein, these interactions were only applied where stated, most results shown were automatically produced without use of any tools. The examples where an interaction was applied typically represent cases for which other methods completely fail.

One tool comprises a bone-influence brush that is used to modify the $\{B(i)\}$ after sparsification. The user selects a bone j and then increases/decreases its influence by adding/removing j to/from the B sets. This enables the locality of the bone influence to be easily adjusted.

Another tool comprises weight-constraint brush that is used to add weight constraints (see Section 4.3). The weight-constraint values can be taken from different skinning techniques or set to zero/one to reduce/increase certain bone influences.

Figure 17:
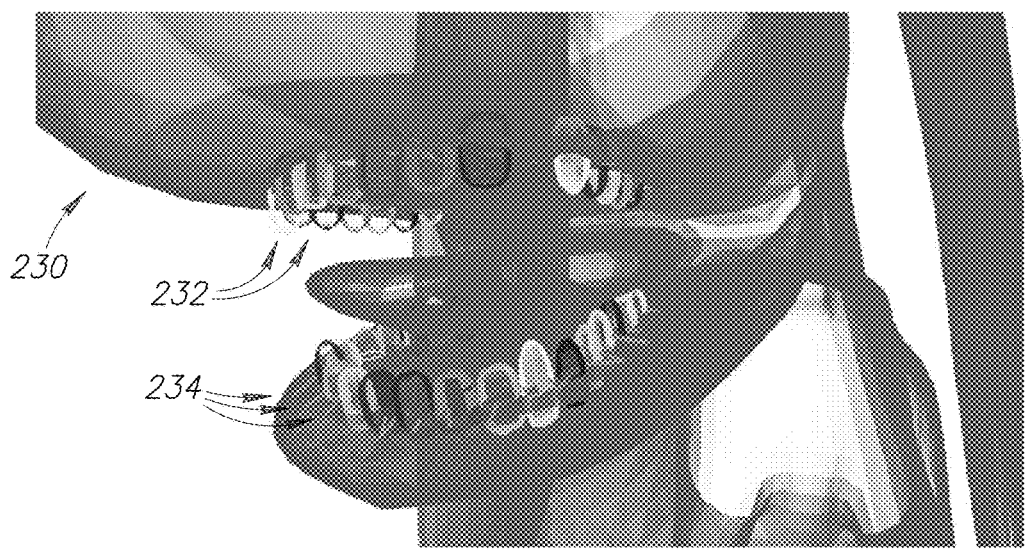
FIG. 17 is a diagram illustrating example links added via wire-edges to the teeth of a dog's mouth.
Figure 18A:
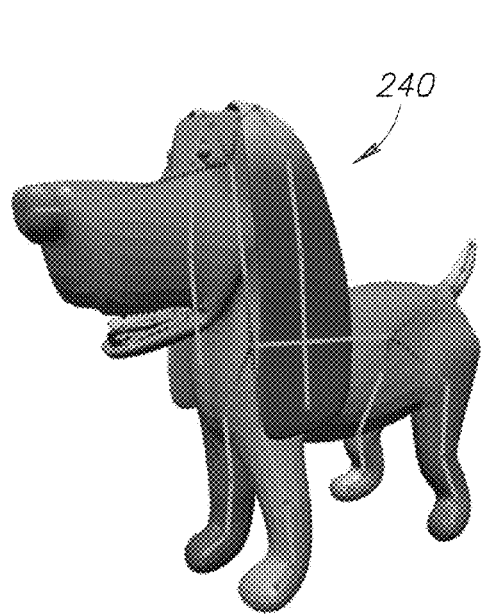
FIGS. 18A, 18B, 18C, 18D, 18E are diagrams illustrating transformations for an example dog skeleton and mesh using the weights created using the present invention and an existing state-of-the-art weight computation technique, respectively.
Figure 18B:
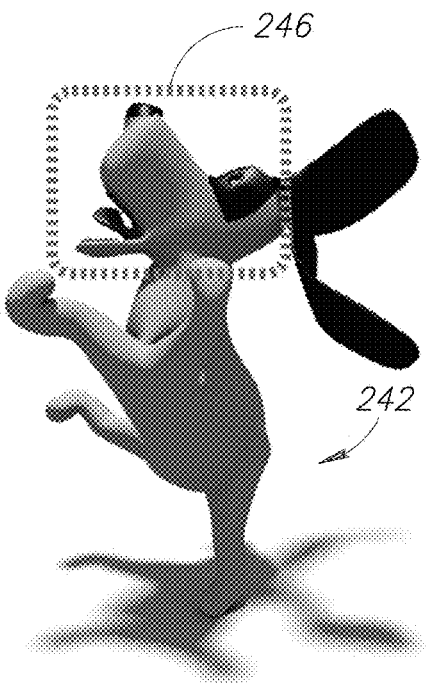
Figure 18C:
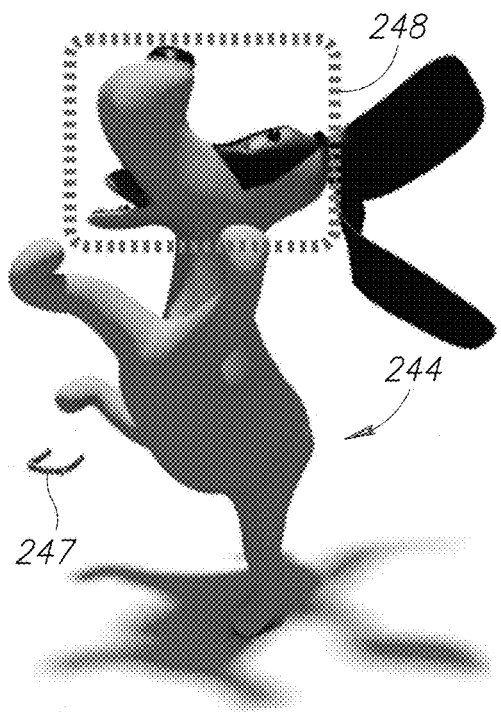
Figure 18D:
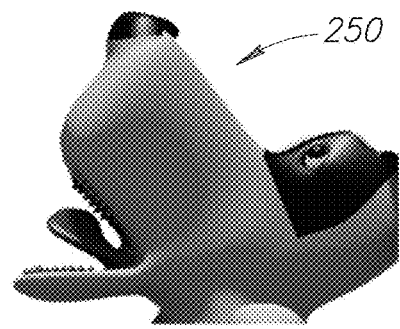
Figure 18E:
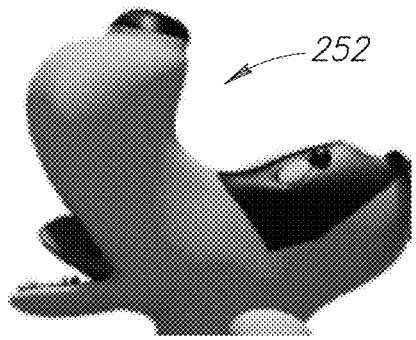

A third tool comprises a wire-edge brush that functions to link disconnected components, which are common in many artist-designed 3D models. These elements, even when modeled independently are usually intended to stay in close proximity, but without a spatial link, the LBS deformations might separate them. An example of a dog is shown in FIGS. 17, 18A, 18B, 18C, 18D, and 18E. In FIG. 17, the dog 230 has teeth 232 and wire edges 234 added in order to create a connection between the teeth and the muzzle. In FIG. 18A, the skeleton of the dog 240 is shown as well as the weights created using the present invention. Note that each bone is associated with a different tone or shading, and the shades on the mesh indicate the blending of the various bones' influence using the weights. FIG. 18B shows results of the dog 242 using the method of the present invention. The area 246 of the head is shown enlarged in FIG. 18D where the dog 250 has all its teeth intact. FIG. 18C shows results of the dog 244 using prior art techniques. Note that the dog's teeth 247 are not in its mouth where they should be. Area 248 of the head is shown enlarged in FIG. 18E which shows teeth missing from the mouth of the dog 252 as well as the non-rigidly deformed muzzle.

This brush allows the user to add these links via wire-edges using mouse clicks. Wire edges i→j connecting vertices i and j in the ARAP energy are added (234, FIG. 17) with the following weights:

$$\lambda_{ij} = \frac{\sum_{k \in V_1(i)} \lambda_{ik}}{|V'_1(i)|} * \min\left(\frac{1}{2}, \frac{|V'_1(i)|}{|V_1(i)|}\right), \qquad (31)$$

where $V_1(i)$ is the set of original vertices adjacent to i and $V'_1(i)$ the new set of adjacent vertices. The goal is to establish a soft connection between the chosen two vertices, i.e. a portion of the weights adjacent to i is attributed to the new edges, while ensuring that their sum does not exceed half the sum of the original weights, thereby prioritizing the original connectivity.

7 Example Results

7.1 Models

Figure 19A:
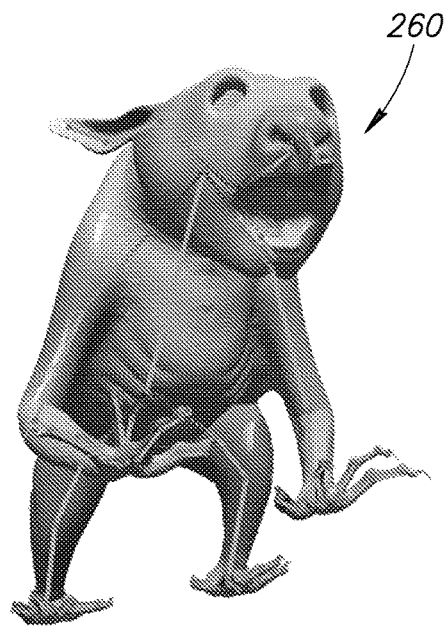
FIGS. 19A, 19B, 19C, 19D, 19E are diagrams illustrating transformations for an example lemur skeleton and mesh using the weights created using the present invention and an existing state-of-the-art weight computation technique, respectively.
Figure 19B:
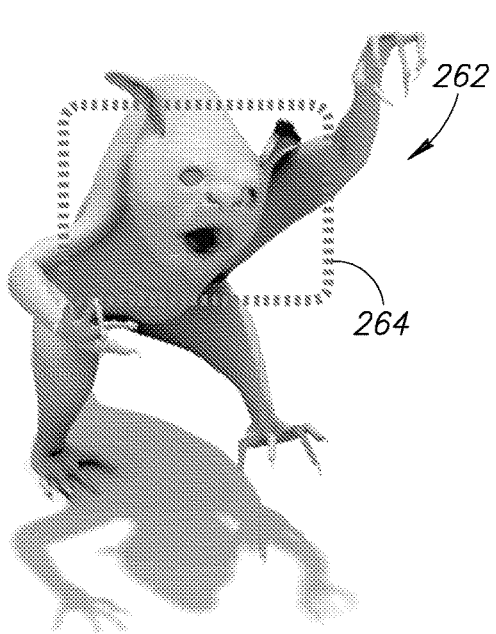
Figure 19C:
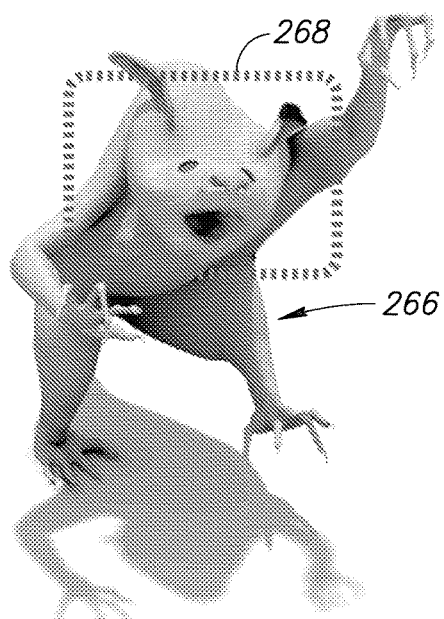
Figure 19D:
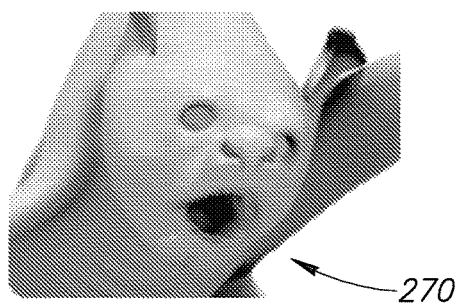
Figure 19E:
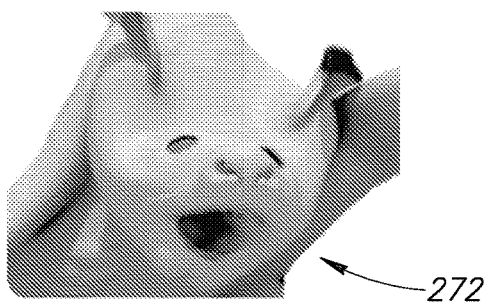

Drawings of a lemur illustrating the results using the methods of the present invention are shown in FIGS. 19A, 19B, 19C, 19D and 19E. The skeleton and mesh of the model 260 is shown in FIG. 19A while the transformation of the body using the methods of the present invention is shown in FIG. 19B. A portion 264 of the resultant transformation 262 is shown enlarged (270) in FIG. 19D. Transformations using prior art methods are shown in FIG. 19C. A portion 268 of the resultant transformation 266 is shown enlarged (272) in FIG. 19E.

Figure 20A:
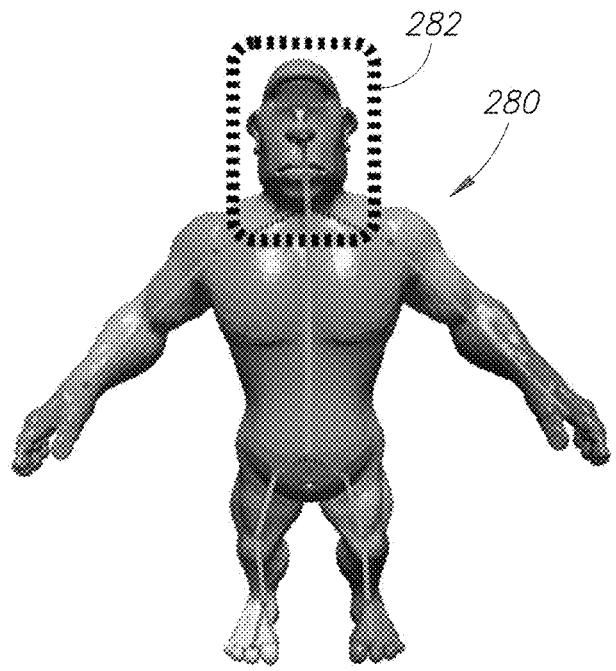
FIGS. 20A, 20B, 20C, 20D, 20E, 20F, 20G, 20H are diagrams illustrating transformations for an example body skeleton and mesh using the weights created using the present invention and an existing state-of-the-art weight computation technique, respectively.
Figure 20B:
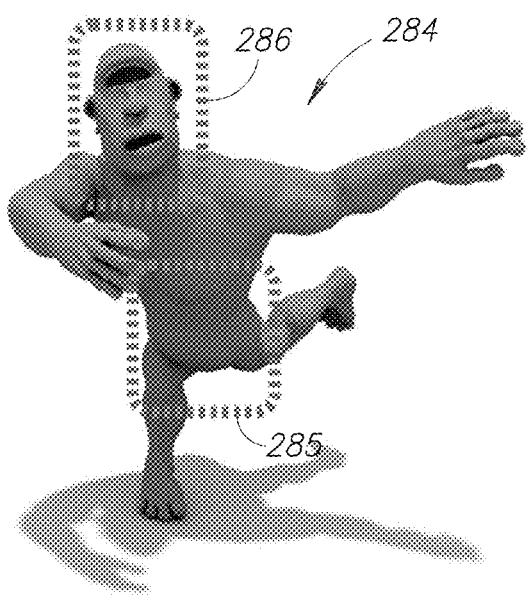
Figure 20C:
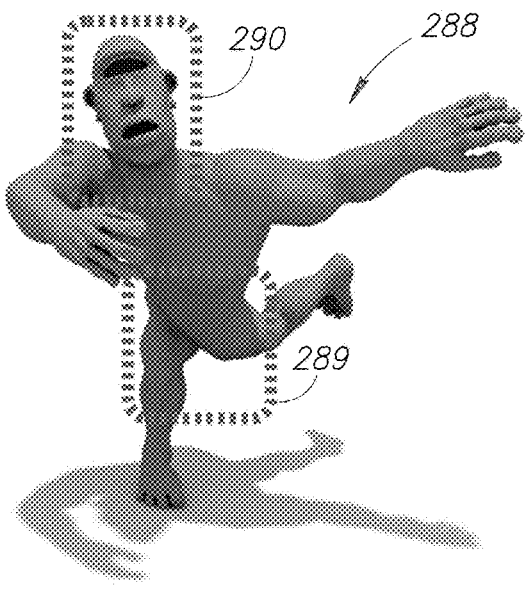
Figure 20D:
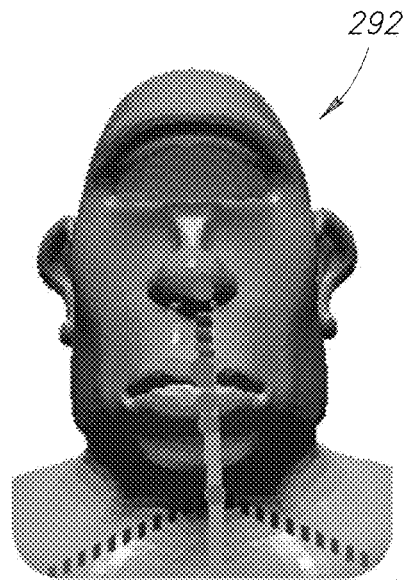
Figure 20E:
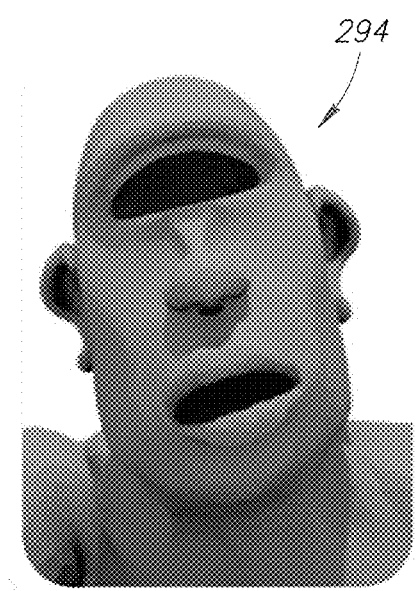
Figure 20F:
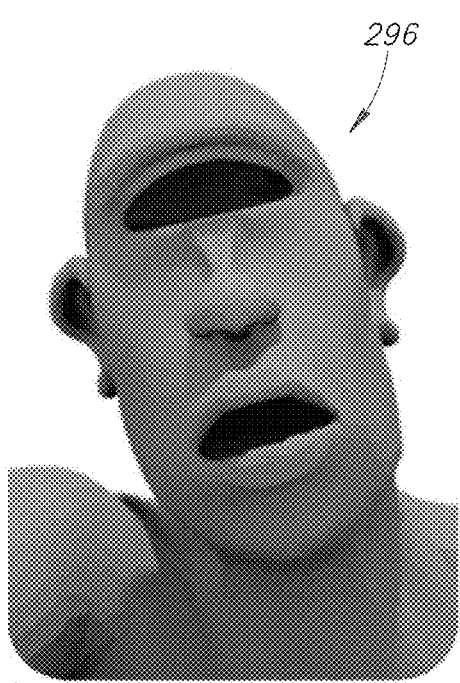
Figure 20G:
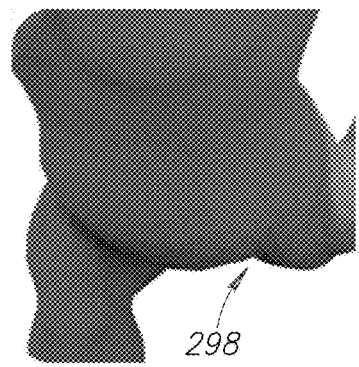
Figure 20H:
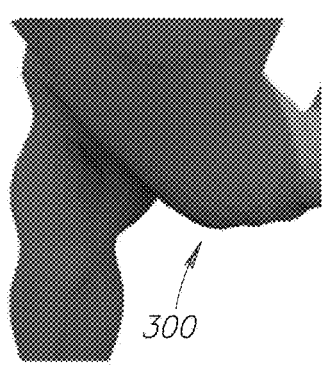

Drawings of an ogre illustrating the results using the methods of the present invention are shown in FIGS. 20A, 20B, 20C, 20D, 20E, 20F, 20G and 20H. The skeleton and mesh of the full body model 280 is shown in FIG. 20A along with the LBS weights once again depicted by blending shades associated with the bones. The transformation of the body using the methods of the present invention is shown in FIG. 20B. The head portion 286 of the resultant transformation 284 is shown enlarged (294) in FIG. 20E. The lower torso portion 285 of the resultant transformation 284 is shown enlarged (298) in FIG. 20G. A portion of the skeleton and mesh of the head region 292 is shown in FIG. 20D. Transformations of the body using prior art methods are shown in FIG. 20C. The head portion 290 of the resultant transformation 288 is shown enlarged (296) in FIG. 20F. The lower torso portion 289 of the resultant transformation 288 is shown enlarged (300) in FIG. 20H.

Note that to illustrate practicality, most models used were challenging, produced by artists, and provided via Blendswap (blendswap.com). They exhibit disconnected components (e.g., dog, dinosaur), tiny features, non-manifold vertices (the dinosaur), boundaries and very elongated triangles, self-intersections (e.g., the dog) and complex topology. The skeletons used are relatively complex, partially disconnected, with various bones types, and scales (i.e. from main limbs to fingers) and may include deformation constraints.

Except for the dog example, all weights were computed fully automatically. For the dog, wire-edges were added (described supra) to connect the teeth to the jaw and the bone-influence brush was used in order to correct the influence maps which were incorrect around the muzzle, as the input heat-diffusion weights were of poor quality (see FIG. 8C). The mixed-weight brush was used on the tip of the nose, to enforce a strong influence of the bone there. It results in an apparent local stretch, which was used to illustrate that artistic choices remain possible. The user interaction took less than one minute.

7.2 Timing

An example implementation of the present invention was sufficiently fast enough for almost-interactive work sessions. For all models, preprocessing took 5 to 20 seconds, while each optimization iteration took 0.5 to 3 seconds. Joint optimization was slightly more costly, depending on the topology of the skeleton. For all examples, it took 5 to 10 seconds for system factorization and 1 to 4 seconds per iteration. Approximately 20 iterations were performed.

7.3 Volumetric Structures

Relying on volumetric structures poses a significant challenge in practice. For example, not all scenes could be used with bounded biharmonic weights (BBW). The necessary tetrahedrization (using TetGen for an exact input-face reproduction and CGAL for an approximate one) failed on several examples.

To illustrate the fundamental issue, consider the dog example above. The teeth were modeled independently of the mouth, a common choice of artists. Their intersection with the mouth and tongue would make an animation impossible, as a watertight tetrahedrization would sew the mouth shut. It is conceptually impossible to represent the mesh as the 2-boundary of a volume and not because of non-manifold structure. No prior art mesh-repairing technique can solve this problem. The wire-edge brush of the present invention, however, connects these entities and ensures a correctly deformed output (FIGS. 17, 18A, 18B, 18C, 18D and 18E). The method of the present invention is general enough to deal with these complicated cases and delivers high quality skinning.

7.4 Comparison with Bounded Biharmonic Weights (BBW)

For most meshes, a tetrahedrization can be obtained only after manually tuning the surface and the resulting tetrahedrization, which could take several minutes per model. These changes, however, necessarily modified the input mesh structure (causing issues for textures) or the skeleton's geometry (which should only be driven by the artist's intentions, not by avoidance of issues). Still, even if a tetrahedrization could be produced, several numerical issues arise due to fine structures, leading to problems in the BBW solver.

The methods of the present invention operate on meshes and volumes. FIGS. 21A, 21B, 21C, 21D, 21E and 21F show example results of how the methods described herein can improve upon BBW weights, which were used here to initialize the weights. The BBW robustness issues are reflected by the lost influence of the index fingertip (314/312 compared to 324/316) of the hand 310 versus the hand 320.

Figure 21B:
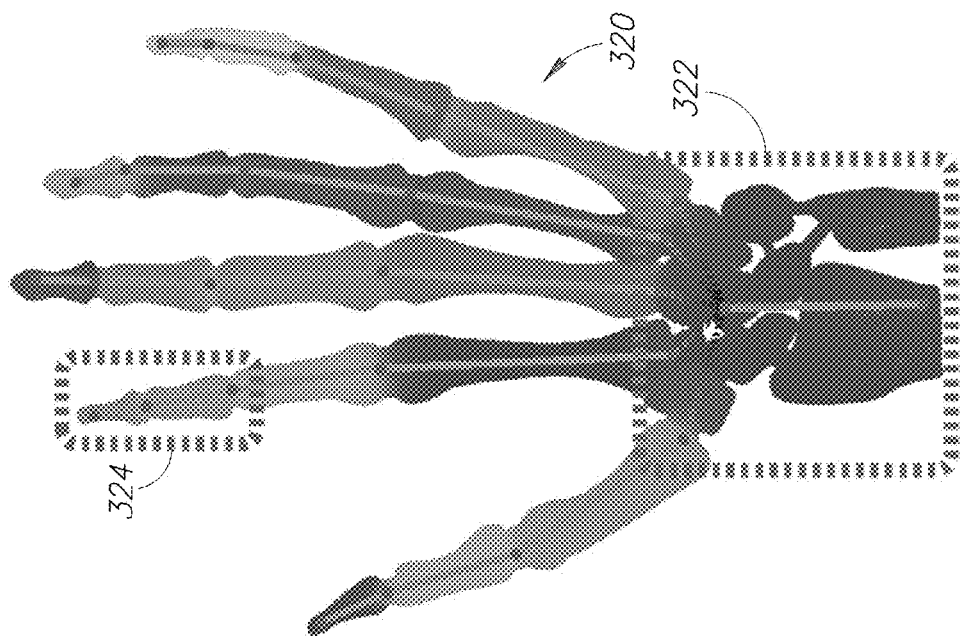
FIGS. 21A, 21B, 21C, 21D, 21E, 21F are diagrams illustrating a comparison with bounded biharmonic weights.
Figure 21A:
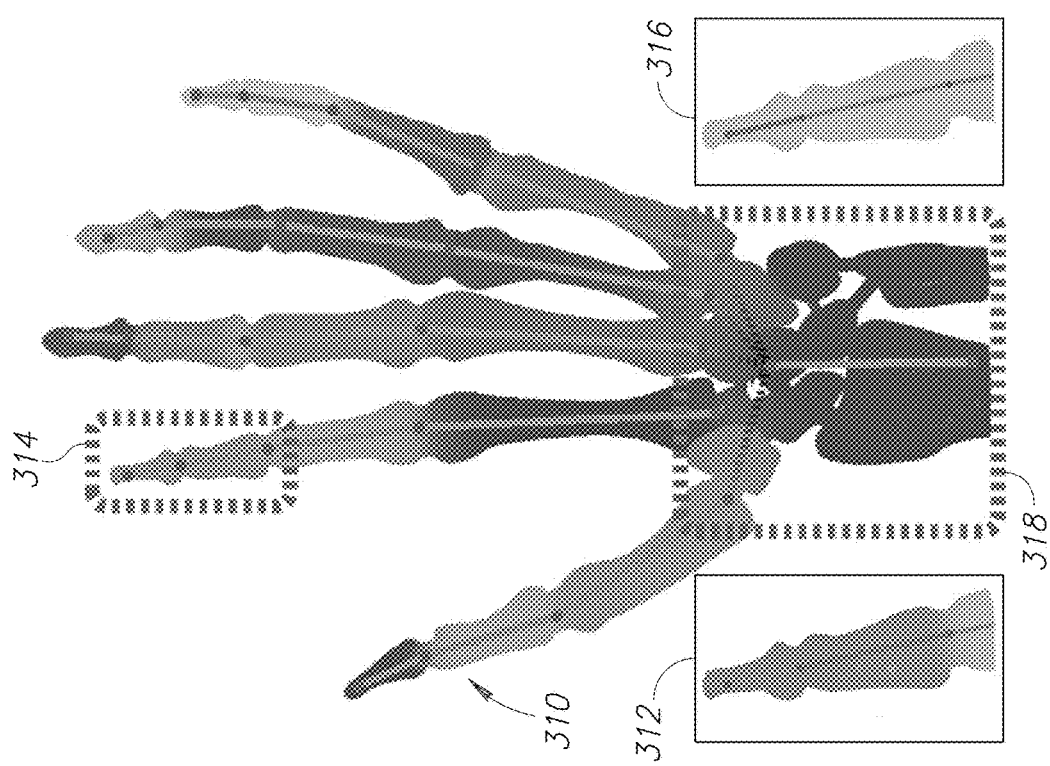
Figure 21D:
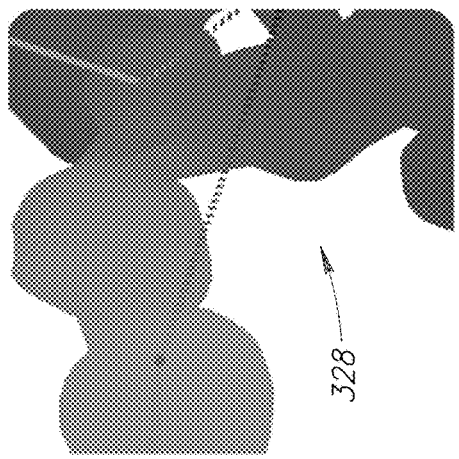
Figure 21F:
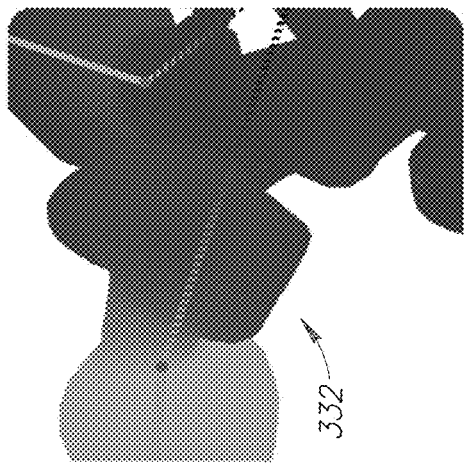
Figure 21C:
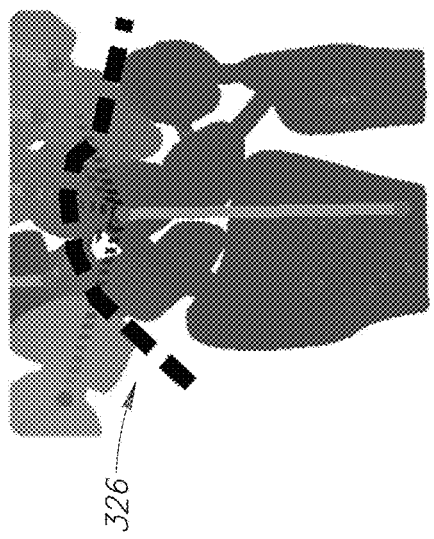
Figure 21E:
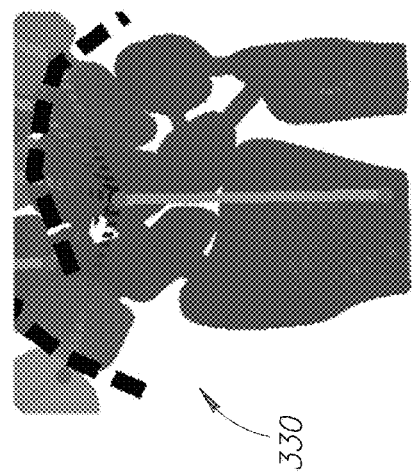

Section 318 of the BBW example is shown enlarged as 326 in FIG. 21C. Section 322 of the optimized results using the present invention is shown enlarged as 330 in FIG. 21E. The tiny features led to small tetrahedra causing numerical issues, even after enforcing the skeleton to be part of the tetrahedrization and ensuring its containment within the mesh. These points illustrate the practical difficulties, which arise even for standard models. Using weight constraints (see Section 6), it is possible to recover the missing influence (324) after a few iterations of the algorithm of the present invention. This example additionally illustrates the usefulness of virtual segments, which make the bone influences change precisely at the joints of the palm, which better reflects the user intention, e.g., see the rotation of the thumb in FIGS. 21D (328) and 21F (332). It is noted applying the method to the surface mesh automatically leads to high-quality skinning even without any user intervention.

7.5 Disconnected Skeletons

Figure 22A:
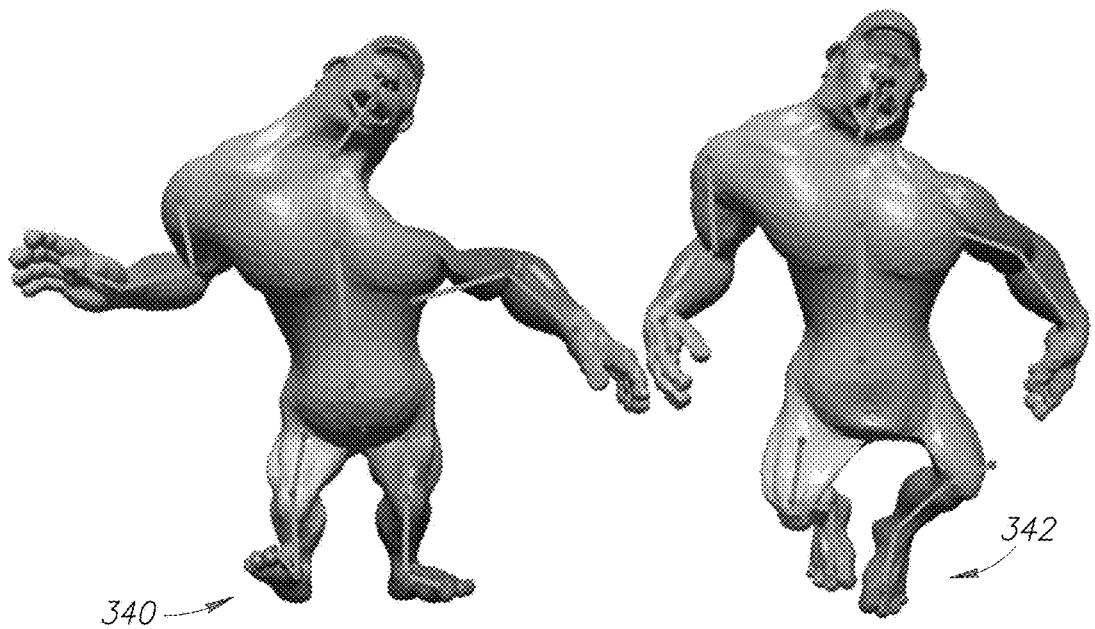
FIGS. 22A, 22B, 22C are diagrams illustrating an example disconnected skeleton and resultant optimized weights and deformations.
Figure 22B:
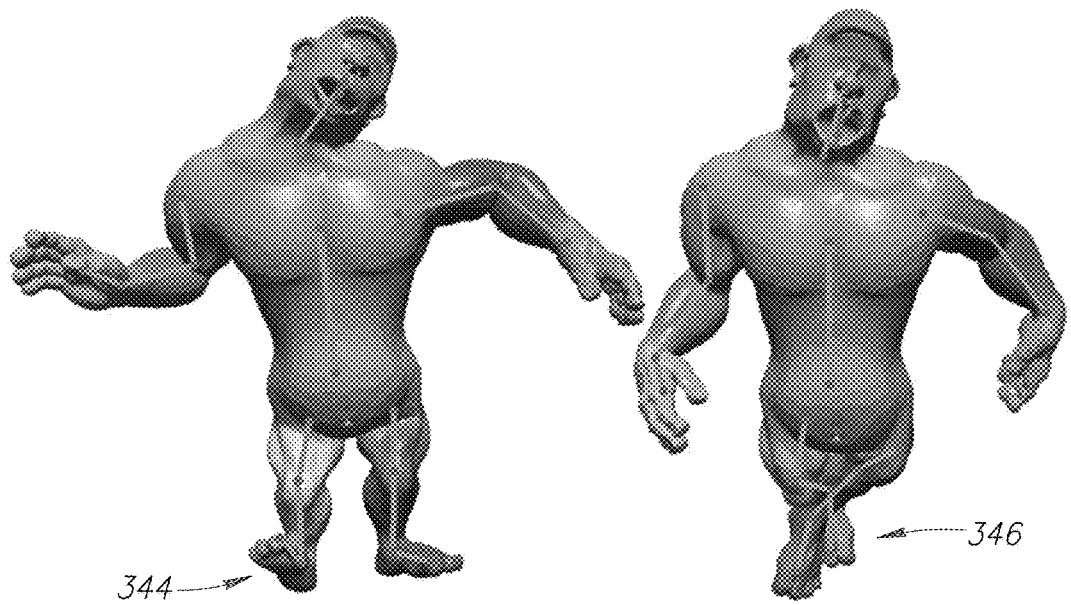
Figure 22C:
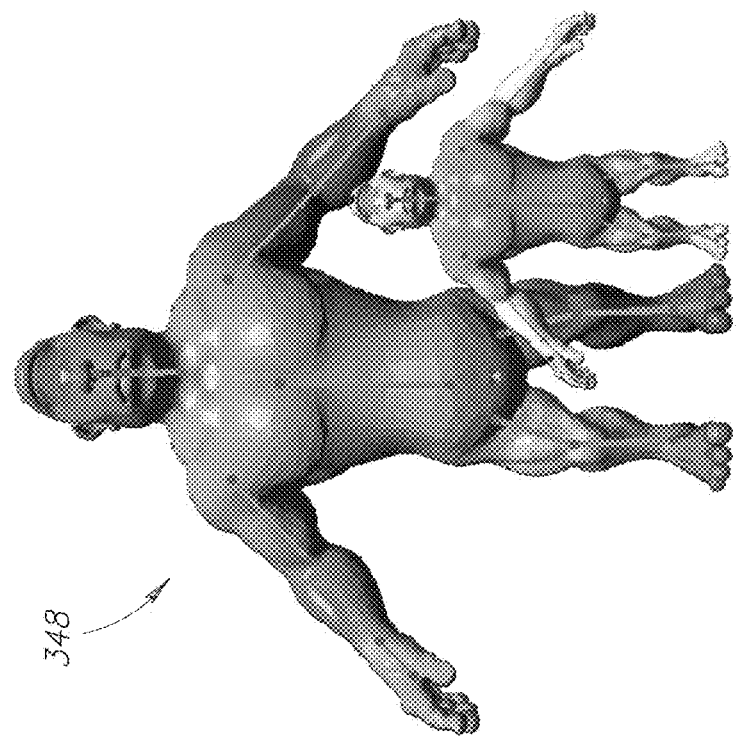
Figure 24A:
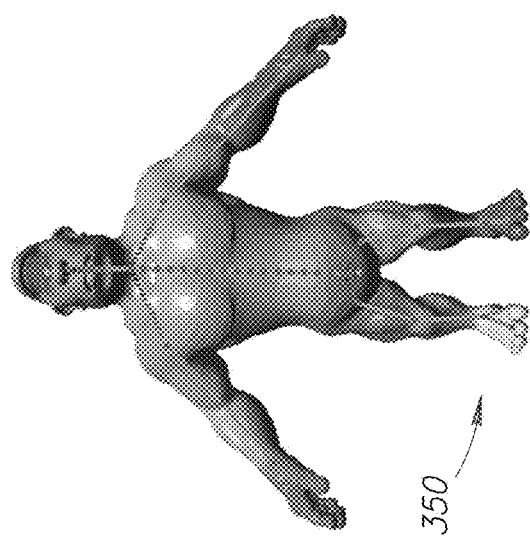
FIGS. 24A, 24B, 24C, 24D, 24E are diagrams illustrating transformations for an example body skeleton and mesh using 16 small bones and a spine deformer subdivided into 16 bones after the weight optimization performed using the present invention, respectively.
Figure 24B:
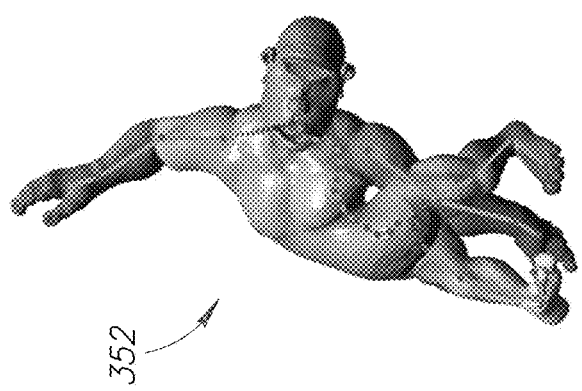

The methods of the present invention support highly disconnected skeletons such as shown in FIGS. 22A, 22B and 22C. Here, the constraints of the skeleton 340, 342 (e.g., fixed bone length, etc.) are not enough to create skeleton deformation exemplars that are pertinent to steer the weight optimization. For example, taking one arm and moving it by 100 meters will still preserve all skeletal constraints, while introducing a high amount of stretch. By alternating between weight and connected-component optimizations, the lost constraints are progressively recovered and the incorrect exemplars are mapped to a set of useful exemplars to train ARAP weights. For illustration purposes, joints were not optimized, but only the average displacement of the connected components. Example optimized weights and deformations 344, 346 are shown in FIG. 22B while example output weights 348 are shown in FIG. 22C.

7.6 Joint Optimization

Figure 23A:
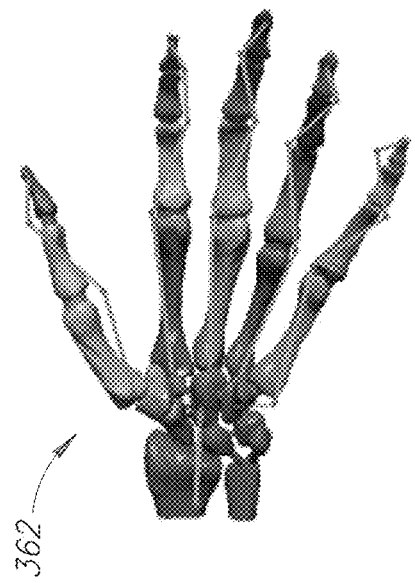
FIGS. 23A, 23B, 23C are diagrams illustrating the results of joint optimization of the present invention.
Figure 23B:
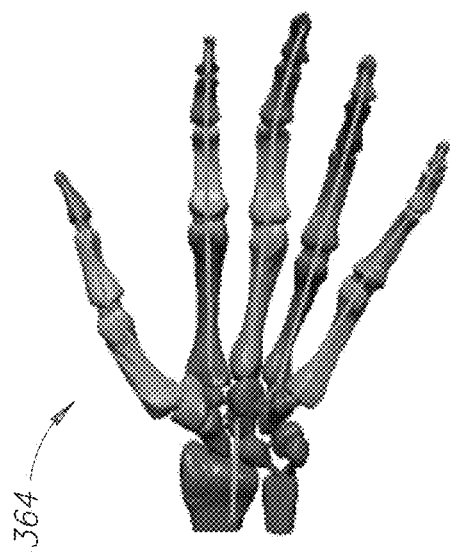
Figure 23C:
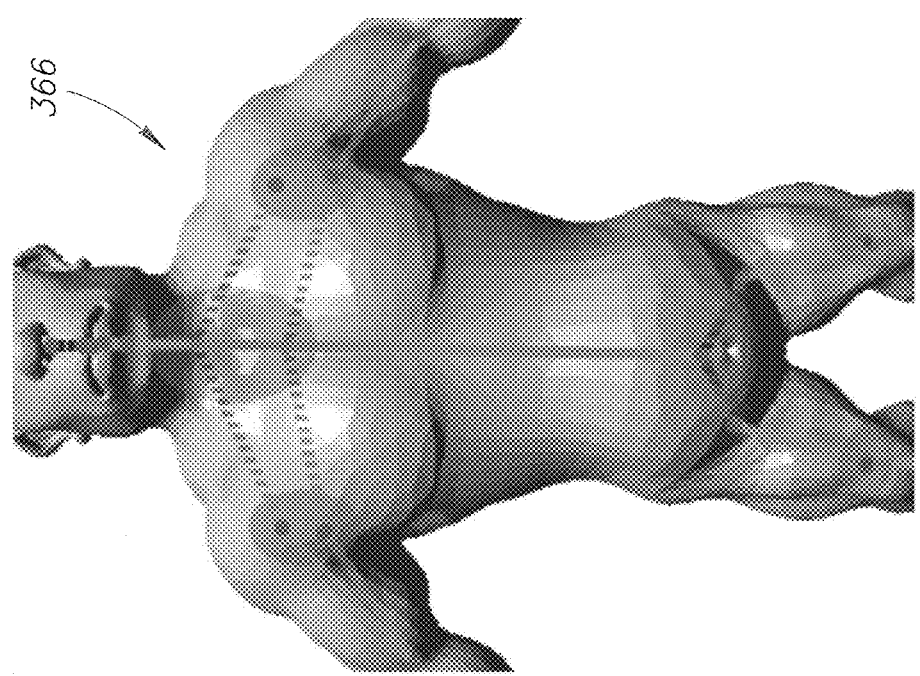

The joint optimization method of the present invention supports users by placing joints at adequate locations, which naturally resemble articulations, even on cases where the topologies of the mesh and the skeleton do not match. FIGS. 23A, 23B and 23C show how well the correction performs. The skeleton 362 does not have to be placed perfectly in the interior of the mesh. The joint optimization does not rely on a special type of weights. It can be used in conjunction with any type of weight definitions (not only those described supra) and will optimize the skeleton accordingly. For all comparison examples shown, optimized skeletons for the competitors were used which improved their deformation. The result 364 of five iterations is shown in FIG. 23B while before and after results 366 are shown in FIG. 23C.

7.7 Parameterized Bones

Figure 24C:
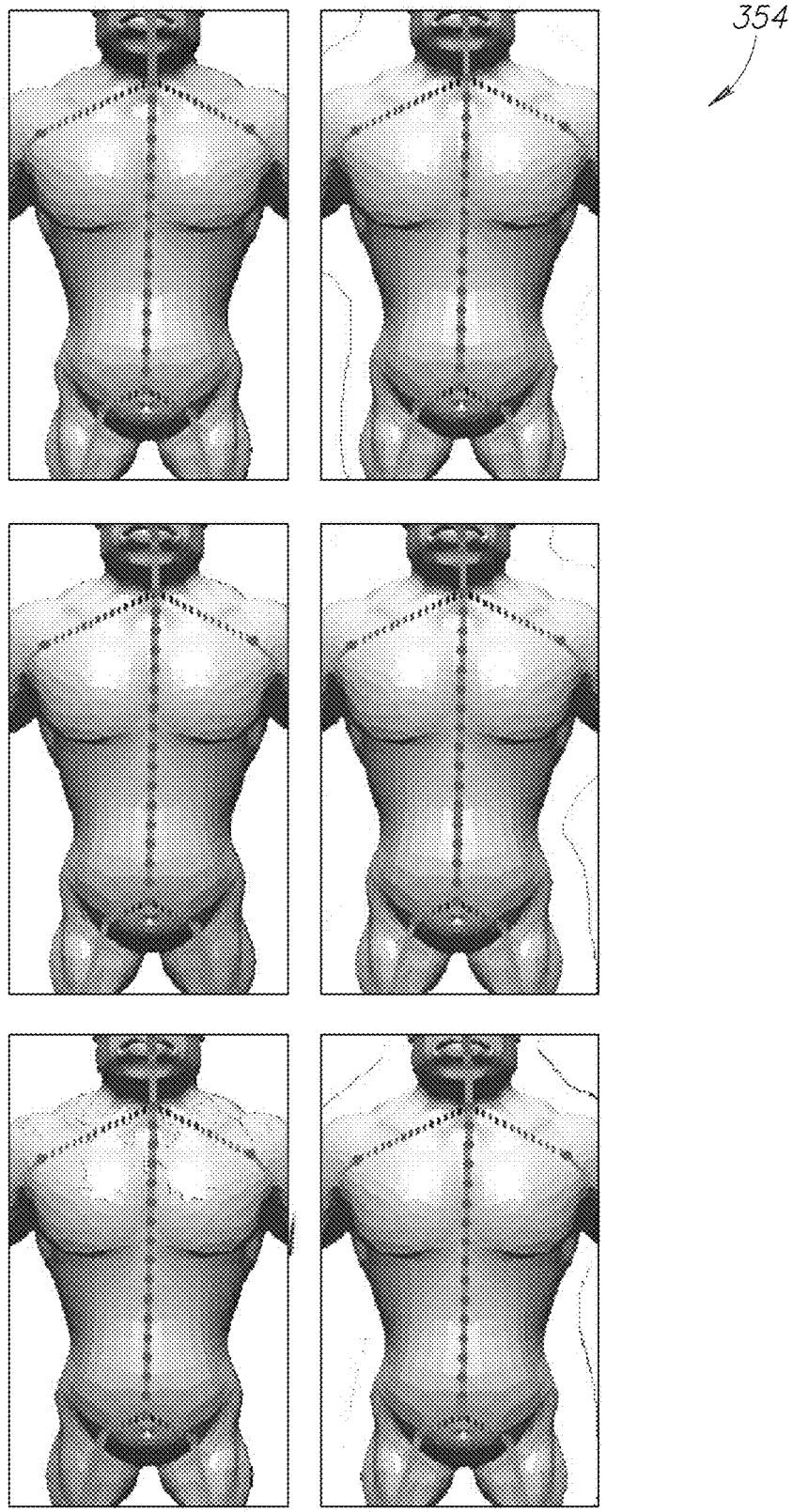
Figure 24E:
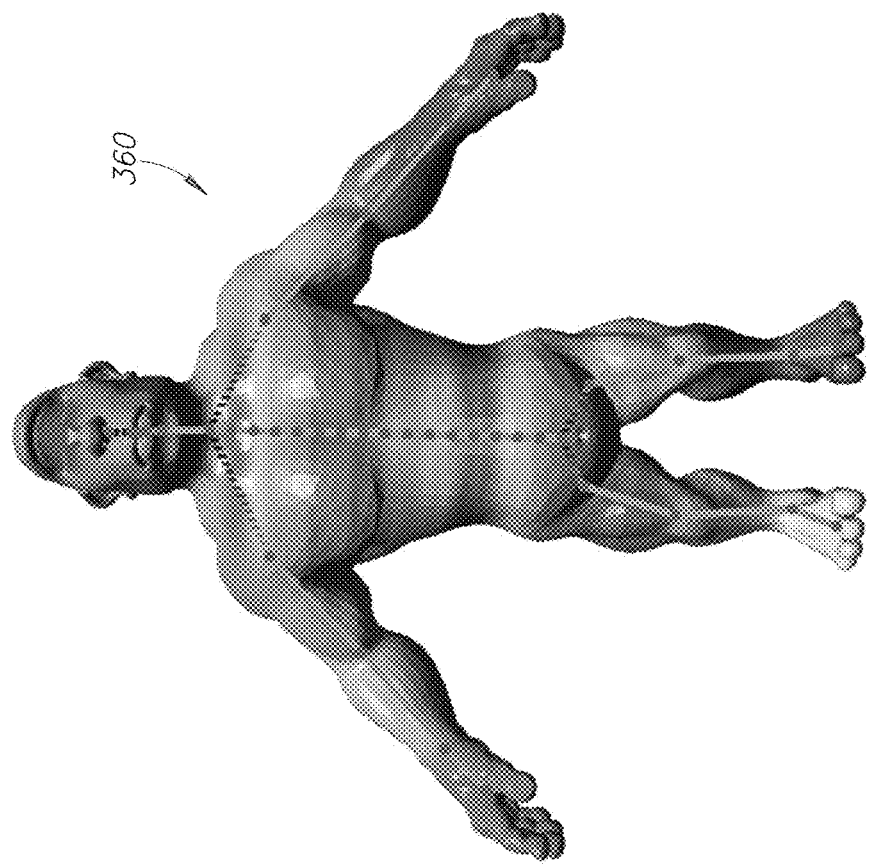
Figure 24D:
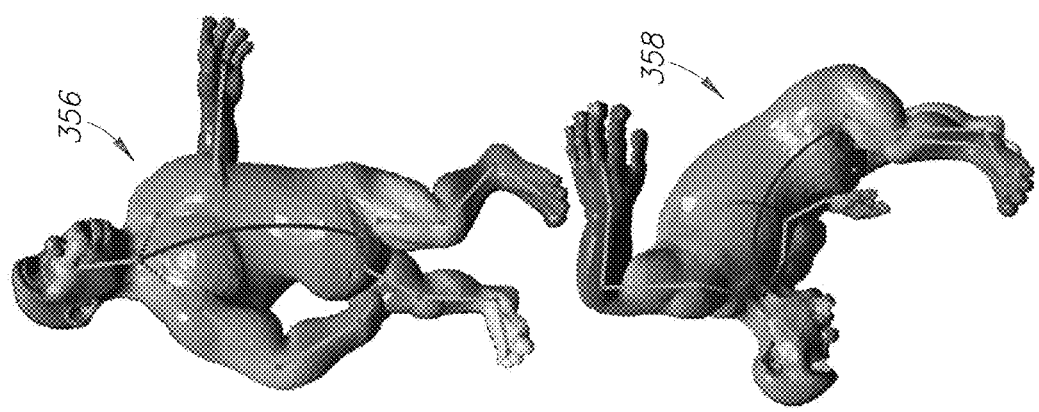

It is noted that the methods of the present invention are compatible with parameterized bones (see Section 1) and can generate weights, which typically cannot be obtained without knowledge of the user's intent. For example, defining a spine with standard bones, an artist would typically use many bones and weights that lead to a banding pattern. While small rotations might mimic the human anatomy, large rotations result in a high stretch and implausible transformations regardless of the weight definition. As a result, the created weights are suboptimal, and the influence of many bones is lost (see FIG. 24C). Using a spine deformer (see FIG. 24D), the method of the present invention generates high-quality weights (see weight maps in FIG. 24D). The spine can be converted into many bones in a post process (see Section 1 and FIG. 24E), leading to the expected banding pattern. Note, that the upper-bone weights of the torso blend naturally with the those of the arms and neck.

Thus, the systems and methods of the present invention provide a practical, robust, fast and high-quality skinning solution, having wide applicability and capability of handling numerous complicated cases that are too difficult or impossible for prior art solutions to handle. The system and methods operate to sample the space of possible deformations of a skeleton resulting in meaningful weights, i.e. that minimize the ARAP energy. Furthermore, motion constraints, which are often available or easy to define, are naturally integrated. While the example results shown herein illustrate that the techniques of the present invention achieve good automatic solutions for various cases, skinning tools to resolve ambiguous situations are also provided. The resulting constraints are used for the optimization process, which makes it possible to apply these user annotations coarsely with quick interactive feedback.

8 Computer Embodiment

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

Figure 25:
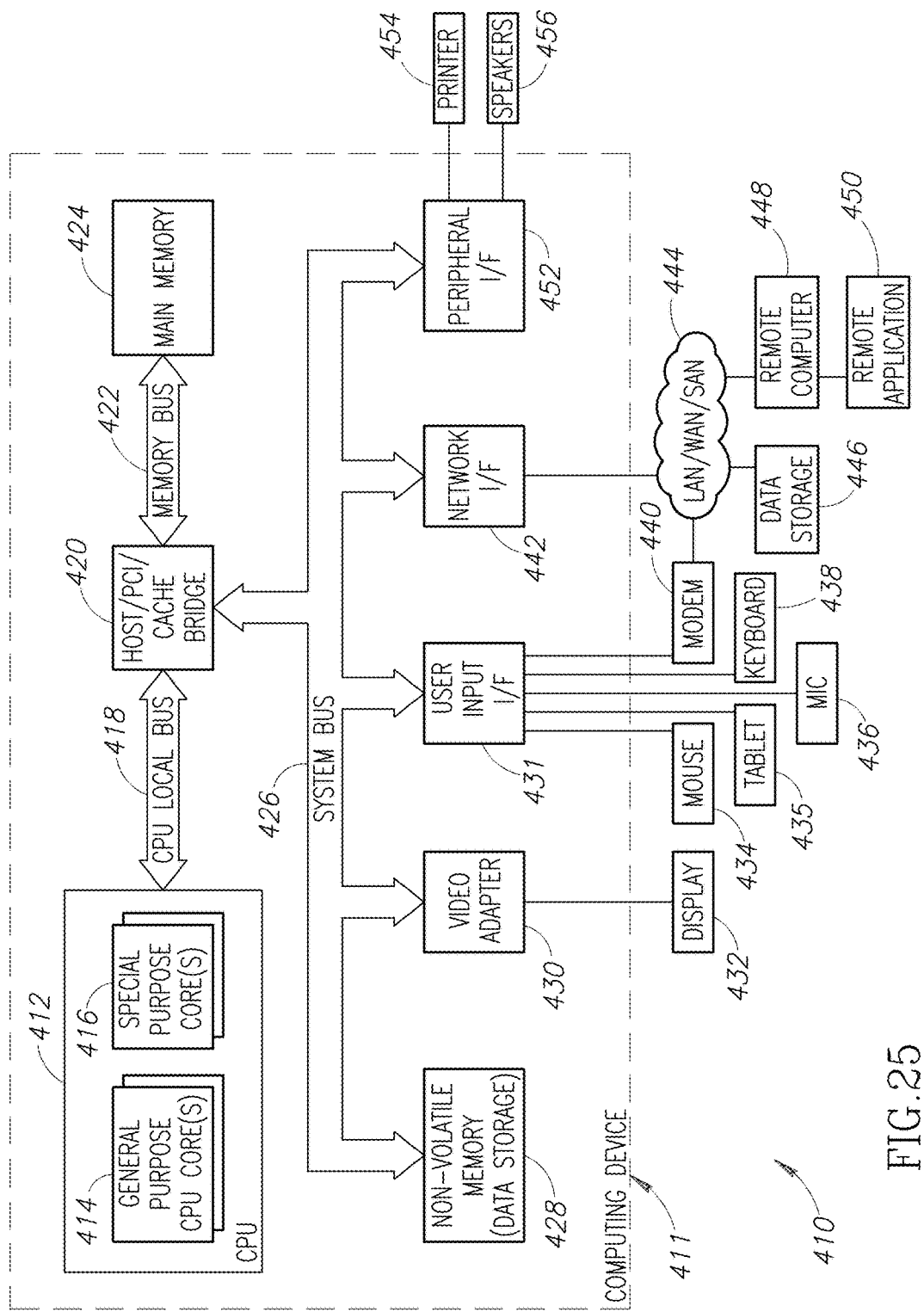
FIG. 25 is a block diagram illustrating an example computer processing system adapted to implement the linear blend skinning (LBS) methods of the present invention.

A block diagram illustrating an example computer processing system adapted to implement the electronic catalog system of the present invention is shown in FIG. 25. The exemplary computer processing system, generally referenced 410, for implementing the invention comprises a general purpose computing device 411. Computing device 411 comprises central processing unit (CPU) 412, host/PIC/cache bridge 420 and main memory 424.

The CPU 412 comprises one or more general purpose CPU cores 414 and optionally one or more special purpose cores 416 (e.g., DSP core, floating point, etc.). The one or more general purpose cores execute general purpose opcodes while the special purpose cores execute functions specific to their purpose. The CPU 412 is coupled through the CPU local bus 418 to a host/PCI/cache bridge or chipset 420. A second level (i.e. L2) cache memory (not shown) may be coupled to a cache controller in the chipset. For some processors, the external cache may comprise an L1 or first level cache. The bridge or chipset 420 couples to main memory 424 via memory bus 420. The main memory comprises dynamic random access memory (DRAM) or extended data out (EDO) memory, or other types of memory such as ROM, static RAM, flash, and non-volatile static random access memory (NVSRAM), bubble memory, etc.

The computing device 411 also comprises various system components coupled to the CPU via system bus 426 (e.g., PCI). The host/PCI/cache bridge or chipset 420 interfaces to the system bus 426, such as peripheral component interconnect (PCI) bus. The system bus 426 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 428, video/graphics adapter 430 connected to display 432, user input interface (I/F) controller 431 connected to one or more input devices such mouse 434, tablet 435, microphone 436, keyboard 438 and modem 440, network interface controller 442, peripheral interface controller 452 connected to one or more external peripherals such as printer 454 and speakers 456. The network interface controller 442 is coupled to one or more devices, such as data storage 446, remote computer 448 running one or more remote applications 450, via a network 444 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 428 may include various removable/non-removable, volatile/nonvolatile computer storage media, such as hard disk drives that reads from or writes to non-removable, nonvolatile magnetic media, a magnetic disk drive that reads from or writes to a removable, nonvolatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 431. Examples of input devices include a keyboard and pointing device, mouse, trackball or touch pad. Other input devices may include a microphone, joystick, game pad, satellite dish, scanner, etc.

The computer 411 may operate in a networked environment via connections to one or more remote computers, such as a remote computer 448. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 411 is connected to the LAN 444 via network interface 442. When used in a WAN networking environment, the computer 411 includes a modem 440 or other means for establishing communications over the WAN, such as the Internet. The modem 440, which may be internal or external, is connected to the system bus 426 via user input interface 431, or other appropriate mechanism.

The computing system environment, generally referenced 410, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 25 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, elements, components and/or groups thereof.

The corresponding structures, materials, acts and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application and to enable others of ordinary skill in the art to understand the invention for various embodiments with various modifications as are suited to the particular use contemplated.

What is claimed is:

1. A method of facilitating life-like, natural and realistic computer character animation for displaying on a display device by generating weights on a 3D mesh model representing a computer animation character to be manipulated by an artist in the form of a polygonal mesh for linear blend skinning (LBS) transformations based on an input mesh and a skeleton, the method comprising:

receiving 3D mesh information and skeleton information related to the model of the computer animation character;

generating a plurality of representative structure preserving deformation skeleton exemplars sampled from a manipulation space of all possible skeleton deformations;

generating optimized as rigid as possible (ARAP) transformations utilizing said plurality of representative structure preserving deformation exemplars;

generating optimized linear blend skinning weights for deformities in accordance with said optimized ARAP transformations;

transforming and skinning the 3D mesh model, in accordance with manipulations to the computer animation character by the artist, by blending bone transformations utilizing said optimized linear blend skinning weights which define an influence the bones have on mesh vertices such that resulting 3D mesh deformities are as rigid as possible;

wherein said optimized linear blend skinning weights optimally deform a surface of said 3D mesh in conformance with the ARAP transformations when said skeleton is manipulated by an artist;

wherein said ARAP energy to be minimized defines how much the transformations of the neighborhood of every vertex differ from rotations and depends on an ARAP transformation function $f$, which depends on LBS weights; and applying said LBS weights to a transformation of the skeleton of the computer animation character, including the rotation and translation of the various bones, where the LBS weights are optimized to obtain a deformation $f$, which minimizes ARAP energy and in which the computer animation character, as manipulated by the artist and displayed on the display device, deforms utilizing the LBS weights in an as rigid as possible manner thereby providing life like, realistic and natural movement thereof on the display device.

2. The method according to claim 1, wherein said representative deformation exemplars of said skeleton are provided from an external source.

3. The method according to claim 1, wherein said representative deformation exemplars of said skeleton are generated based on random constrained rotation of the bones of said skeleton.

4. The method according to claim 1, further comprising generating an initial rough estimate for said linear blend skinning weights.

5. The method according to claim 1, further comprising reducing the set of bone influences thereby improving computational efficiency and enforcing locality.

6. The method according to claim 1, wherein optimizing said linear blend skinning weights comprises:

first calculating an optimal set of matrices describing the local transformation of each vertex's neighborhood for each skeleton deformation exemplar;

second calculating an optimal set of linear blend skinning weights; and repeating said steps of first calculating and second calculating until convergence is achieved.

7. The method according to claim 1, wherein said optimizing said linear blend skinning weights comprises minimizing an average as rigid as possible (ARAP) energy $\mathcal{E}$ associated with transformations taken from said manipulation space, and given by $$\mathcal{E}(f, \mathcal{R}) := \sum_{i \in \mathcal{V}} \Lambda_i \underbrace{\sum_{k \in V_1(i)} \lambda_{ik} \left\| \underbrace{(f(v_k) - f(v_i))}_{=:\tilde{e}_{ik}} - R(i) \cdot \underbrace{(v_k - v_i)}_{=:e_{ik}} \right\|^2}_{=:\mathcal{E}_i(f,\mathcal{R}(i)), \text{ the rigidity of vertex } i \text{ assuming rotation } \mathcal{R}(i)},$$

where $V_1(i)$ is a one ring neighborhood of vertex i, R(i) is a rotation matrix associated with vertex i, $\Lambda_i$ is an input vertex weight and $\lambda_{ik}$ is an input weight for directed edge $e_{ik}$ from vertex i to k to account for local discretization of the 3D mesh.

8. The method according to claim 1, wherein said skeleton comprises one or more parameterized bones comprising at least one of a twistable bone, stretchable bone, bendable bone and a spine.

9. A method of generating weights on a 3D model representing a computer animation character to be manipulated by an artist for displaying on a display device in the form of a polygonal mesh for linear blend skinning (LBS) transformations based on an input mesh and a skeleton, the method comprising:

receiving 3D mesh information and skeleton information related to the model of the computer animation character;

generating a plurality of representative structure preserving deformation exemplars of said skeleton sampled from a manipulation space of all possible skeleton deformations;

expressing and calculating as rigid as possible (ARAP) energy for said plurality of representative deformation exemplars in terms of linear blend skinning weights;

optimizing for said linear blend skinning weights in accordance with said deformation exemplars so as to minimize said ARAP energy;

applying said LBS weights to transforming and skinning the 3D mesh model, in accordance with manipulations to the computer animation character by the artist, by blending bone transformations utilizing said optimized linear blend skinning weights which define an influence the bones have on mesh vertices such that resulting 3D mesh deformities are as rigid as possible and in which the computer animation character, as manipulated by the artist and displayed on the display device, deforms utilizing the LBS weights to provide life like, realistic and natural movement thereof on the display device; and wherein said linear blend skinning weights deform a surface of said 3D mesh in an ARAP fashion for arbitrary deformations of the computer animation character in said manipulation space.

10. The method according to claim 9, wherein said optimizing said linear blend skinning weights comprises:
first calculating an optimal set of matrices describing the local transformation of each vertex's neighborhood for each skeleton deformation exemplar;
second calculating an optimal set of linear blend skinning weights;
repeating said steps of first calculating and second calculating until convergence is achieved;
third calculating for each vertex separately an optimal set of matrices that minimizes said ARAP energy;
fourth calculating an optimal set of linear blend skinning weights that minimizes said ARAP energy; and
repeating said steps of third calculating and fourth calculating until convergence is achieved.

11. The method according to claim 9, wherein the number of skeleton deformations in said manipulation space is sufficiently large enough to achieve unbiased optimization of said linear blend skinning weights.

12. The method according to claim 9, wherein said skeleton comprises one or more parameterized bones comprising at least one of a twistable bone, stretchable bone, bendable bone and a spine.

13. A method of generating weights on a 3D model representing a computer animation character to be manipulated by an artist for display on a display device in the form of a polygonal mesh for linear blend skinning (LBS) transformations based on an input mesh and a skeleton, the method comprising:
receiving 3D mesh information and skeleton information related to the model of the computer animation character;
expressing as rigid as possible (ARAP) energy for said plurality of representative deformation exemplars in terms of linear blend skinning weights;
generating initial rough estimates for said linear blend skinning weights;
reducing bone influence for each vertex thereby improving computational efficiency and enforcing locality;
obtaining a plurality of representative structure preserving deformation exemplars of said skeleton from a manipulation space of all possible skeleton deformations;
optimizing said linear blend skinning weights by minimizing an average as rigid as possible (ARAP) energy associated with said plurality of deformation exemplars taken from said manipulation space;
applying said LBS weights to transforming and skinning the 3D mesh model, in accordance with manipulations to the computer animation character by the artist, by blending bone transformations utilizing said optimized linear blend skinning weights which define an influence the bones have on mesh vertices such that resulting 3D mesh deformities are as rigid as possible and in which the computer animation character, as manipulated by the artist and displayed on the display device, deforms utilizing the LBS weights to provide life like, realistic and natural movement thereof on the display device; and wherein said linear blend skinning weights deform a surface of said 3D mesh in an ARAP fashion for arbitrary deformations of the computer animation character in said manipulation space.

14. The method according to claim 13, wherein said representative deformation exemplars of said skeleton are provided from an external source.

15. The method according to claim 13, wherein said representative deformation exemplars of said skeleton are generated based on random constrained rotation of the bones of said skeleton.

16. The method according to claim 13, wherein optimizing said linear blend skinning weights comprises:
first calculating for each vertex separately an optimal set of matrices that minimizes said ARAP energy;
second calculating an optimal set of linear blend skinning weights that minimizes said ARAP energy; and
repeating said steps of first calculating and second calculating until convergence is achieved.

17. The method according to claim 13, wherein said skeleton comprises one or more parameterized bones comprising at least one of a twistable bone, stretchable bone, bendable bone and a spine.

18. A method of generating weights on a 3D model representing a computer animation character to be manipulated by an artist for display on a display device of the form of a polygonal mesh for linear blend skinning (LBS) transformations based on an input mesh and a skeleton incorporating bone transformations containing stretch, the method comprising:
receiving 3D mesh information and skeleton information incorporating bone transformations containing stretch, said mesh information and said skeleton information related to the 3D model of the computer animation character;
generating a plurality of representative structure preserving deformation exemplars of said skeleton sampled from a manipulation space of all possible skeleton deformations;
defining an optimal set of matrices describing the local transformation of each vertex's neighborhood for each skeleton deformation exemplar;
calculating, for each vertex, the stretch induced on the vertex's neighborhood when the bones influencing said vertex are stretched;
optimizing said set of matrices by blending the stretch induced by the bones of said skeleton;
expressing the energy for said plurality of representative deformation exemplars in terms of linear blend skinning weights;
optimizing for said linear blend skinning weights in accordance with said deformation exemplars so as to minimize said energy;
applying said LBS weights to transforming and skinning the 3D mesh model, in accordance with manipulations to the computer animation character by the artist, by blending bone transformations utilizing said optimized linear blend skinning weights which define an influence the bones have on mesh vertices such that resulting 3D mesh deformities are as rigid as possible and in which the computer animation character, as manipulated by the artist and displayed on the display device, deforms utilizing the LBS weights to provide life like, realistic and natural movement thereof on the display device; and wherein said linear blend skinning weights deform a surface of said 3D mesh for arbitrary deformations of the computer animation character in said manipulation space by an artist.

19. The method according to claim 18, wherein the stretch induced by the bones of said skeleton is determined by computing and analyzing the Jacobian of the transformation induced by said bones.

20. The method according to claim 18, wherein when said bones are constrained to be rigid, said energy falls back to the as rigid as possible (ARAP) energy.

21. The method according to claim 18, wherein blending comprises blending the stretch values induced by said bones in accordance with a set of weights.

22. The method according to claim 18, wherein said representative deformation exemplars of said skeleton are provided from an external source.

23. The method according to claim 18, wherein said representative deformation exemplars of said skeleton are generated based on random constrained rotation of the bones of said skeleton.

24. The method according to claim 18, wherein said skeleton comprises one or more parameterized bones comprising at least one of a twistable bone, stretchable bone, bendable bone and a spine.

\* \* \* \* \*